US012205439B2

(12) United States Patent
Daley et al.

(10) Patent No.: US 12,205,439 B2
(45) **Date of Patent: *Jan. 21, 2025**

(54) KENO GAMES WITH BONUS MARKERS AND ALTERNATIVE WINNING SCENARIOS

(71) Applicant: Aristocrat Technologies, Inc., Las Vegas, NV (US)

(72) Inventors: John Daley, Las Vegas, NV (US); Allon Englman, Las Vegas, NV (US); Daniel Mirjavadi, Las Vegas, NV (US); Christopher Brune, Carson City, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,485

(22) Filed: Feb. 8, 2024

(65) Prior Publication Data

US 2024/0185679 A1 Jun. 6, 2024

Related U.S. Application Data

(63) Continuation of application No. 18/100,871, filed on Jan. 24, 2023, now Pat. No. 11,935,360, which is a (Continued)

(51) Int. Cl.
*G07F 17/32* (2006.01)

(52) U.S. Cl.
CPC ...... *G07F 17/3262* (2013.01); *G07F 17/3204* (2013.01); *G07F 17/3244* (2013.01); *G07F 17/329* (2013.01)

(58) Field of Classification Search
CPC .. G07F 17/32; G07F 17/3204; G07F 17/3244; G07F 17/326; G07F 17/3262;
(Continued)

(56) References Cited

U.S. PATENT DOCUMENTS 5,651,735 A 7/1997 Baba
6,315,290 B1 * 11/2001 Roethel ................ A63F 3/0645 273/273

(Continued)

OTHER PUBLICATIONS

Office Action (Non-Final Rejection) dated Nov. 4, 2022 for U.S. Appl. No. 17/186,628 (pp. 1-9).

(Continued)

*Primary Examiner* — Milap Shah
(74) *Attorney, Agent, or Firm* — Brownstein Hyatt Farber Schreck, LLP

(57) ABSTRACT

A gaming device may perform various electronic games, such as a keno game, and may include a game controller configured to control operations of the performed electronic games. During the course of a game performed on the gaming device, the game controller may control various winning scenarios, including alternate winning scenarios. At certain stages in a keno game, a number of markers may be selected. Before, after, or while these markers are selected, the game controller may determine how many bonus markers will be selected. Based on the number of selected bonus markers, the game controller may initiate a bonus draw phase where an additional number of markers may be selected. After all markers have been selected, any selected bonus markers may be added together and the calculated sum may be added to a credit balance associated with a player of the gaming device.

20 Claims, 14 Drawing Sheets

Related U.S. Application Data continuation of application No. 17/186,628, filed on Feb. 26, 2021, now Pat. No. 11,594,104.

(58) Field of Classification Search
CPC ... G07F 17/3267; G07F 17/329; A63B 45/02; A63F 3/00157; A63F 3/06; A63F 3/064; G07C 15/001
See application file for complete search history.

(56) References Cited

U.S. PATENT DOCUMENTS

| | | | | |
|---|---|---|---|---|
| 6,478,677 | B1 * | 11/2002 | Moody | A63F 3/08 463/19 |
| 6,743,102 | B1 | 6/2004 | Fiechter | |
| 6,902,479 | B1 | 6/2005 | Scott | |
| 7,258,608 | B2 * | 8/2007 | Khal | A63F 3/06 273/269 |
| 8,371,922 | B2 * | 2/2013 | Padgett | G07F 17/32 463/19 |
| 8,668,569 | B2 * | 3/2014 | Gilbertson | G07F 17/326 463/19 |
| 8,740,687 | B1 | 6/2014 | Brown | |
| 8,764,544 | B2 | 7/2014 | Daniels | |
| 9,053,609 | B2 | 6/2015 | Defrance | |
| 9,196,127 | B2 | 11/2015 | Lovaas | |
| 9,472,062 | B2 | 10/2016 | Defrance | |
| 9,741,205 | B2 | 8/2017 | Nguyen | |
| 10,282,946 | B2 | 5/2019 | Brown | |
| 10,762,747 | B2 | 9/2020 | Brown | |
| 11,594,104 | B2 | 2/2023 | Daley | |
| 2003/0054873 | A1 * | 3/2003 | Peterson | G07F 17/3227 463/20 |
| 2003/0069061 | A1 | 4/2003 | Seelig | |
| 2005/0037832 | A1 | 2/2005 | Cannon | |
| 2006/0084490 | A1 | 4/2006 | Khal | |
| 2007/0093287 | A1 | 4/2007 | Brunelle | |
| 2007/0117611 | A1 | 5/2007 | Dodge | |
| 2007/0155470 | A1 | 7/2007 | Brunelle | |
| 2007/0281774 | A1 | 12/2007 | Khal | |
| 2008/0032782 | A1 | 2/2008 | Boesen | |
| 2008/0090634 | A1 | 4/2008 | Baerlocher | |
| 2009/0197663 | A1 | 8/2009 | Schultz | |
| 2009/0197664 | A1 | 8/2009 | Schultz | |
| 2011/0117995 | A1 | 5/2011 | Vallejo | |
| 2014/0080556 | A1 | 3/2014 | Knutsson | |
| 2014/0194180 | A1 | 7/2014 | Elmqvist | |
| 2015/0038209 | A1 | 2/2015 | Lark | |
| 2015/0065222 | A1 | 3/2015 | Lovaas | |
| 2015/0248807 | A1 | 9/2015 | Berman | |
| 2016/0042586 | A1 | 2/2016 | Defrance | |
| 2016/0267741 | A1 | 9/2016 | Humphrey | |
| 2019/0102968 | A1 | 4/2019 | Ludwick | |
| 2019/0102969 | A1 | 4/2019 | Lapalme | |
| 2020/0074805 | A1 | 3/2020 | Selegue | |
| 2020/0134967 | A1 | 4/2020 | Fields | |
| 2020/0242892 | A1 | 7/2020 | Luciano | |
| 2020/0380813 | A1 | 12/2020 | Luciano | |

OTHER PUBLICATIONS

Office Action (Notice of Allowance and Fees Due (PTOL-85)) dated Jan. 19, 2023 for U.S. Appl. No. 17/186,628 (pp. 1-5).
Office Action (Non-Final Rejection) dated Aug. 10, 2023 for U.S. Appl. No. 18/100,871 (pp. 1-13).
Notice of Allowance dated Nov. 20, 2023 for U.S. Appl. No. 18/100,871 (pp. 1-5).
Office Action (Notice of Allowance and Fees Due (PTOL-85)) dated Nov. 20, 2023 for U.S. Appl. No. 18/100,871 (pp. 1-5).

* cited by examiner

KENO GAMES WITH BONUS MARKERS AND ALTERNATIVE WINNING SCENARIOS

CROSS-REFERENCE TO RELATED APPLICATIONS

This application is a continuation of U.S. patent application Ser. No. 18/100,871, filed Jan. 24, 2023, which is a continuation of U.S. patent application Ser. No. 17/186,628, filed Feb. 26, 2021, now U.S. Pat. No. 11,594,104, the contents of which are incorporated herein by reference as if fully disclosed herein.

BACKGROUND

Electronic gaming machines ("EGMs") or gaming devices are used to provide a variety of wagering games such as: slot games; video poker games; video blackjack games; roulette games; video bingo games; keno games; and other types of games that are frequently offered at casinos and other locations. Play on EGMs typically involves a player establishing a credit balance by inputting money, or another form of monetary credit, and placing a monetary wager from the credit balance on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens, or other forms of payout. In the case of "game credits" that are awarded during play, the game credits are typically added to a credit meter total on the EGM and may be provided to the player upon completion of a gaming session or when the player wants to "cash out."

Typical games may use a random number generator (RNG) to randomly determine the outcome of each game. The game may be designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and therefore may not be entirely random.

SUMMARY

The embodiments described herein may include a gaming device comprising certain features related to the performance and simulation of a game and, in certain cases, to a keno game. The gaming device may comprise a display configured to display a keno game having a number of symbols, a user interface configured to receive a player input for the keno game, and a game controller. The player input may specify a subset of the number of symbols displayed on the display of the keno game. In some cases, the game controller may be configured to, during a round of the keno game, determine a number of bonus markers to be drawn, select a predetermined number of standard markers from a collection of standard markers, select the number of bonus markers from a collection of bonus markers, and determine that at least a threshold number of bonus markers has been selected. In some cases, in response to determining that at least the threshold number of bonus markers has been selected, the game controller further initiates a bonus draw phase and selects additional markers from at least one of the collection of standard markers and the collection of bonus markers. Thereafter, the game controller may determine a number of matches between the player input received at the user interface and the selected predetermined number of standard markers and any additional standard markers selected during the bonus draw phase.

Further embodiments described herein may include a method of conducting a keno game on an electronic gaming machine. The method may include the steps of receiving, through a user interface, a selection of a number of symbols shown by the electronic gaming machine on an electronic game board of the keno game, determining a number of bonus markers to be selected, selecting a number of standard markers from a collection of standard markers, selecting the determined number of bonus markers from a collection of bonus markers, and determining that the determined number of bonus markers is at least a threshold number of bonus markers. In some cases, when the determined number of bonus markers is at least the threshold number of bonus markers, the method may include the steps of initiating a bonus phase and selecting additional markers selected from at least one of the collection of standard markers and the collection of bonus markers. Further, the method may include the steps of determining a number of matches between the selection of the number of symbols on the electronic game board and the selected number of standard markers and any additional standard markers selected during the bonus phase.

Further embodiments described herein may include a method of providing bonus drawings through a simulated keno game on an electronic gaming machine. The method may include the steps of initiating the simulated keno game on the electronic gaming machine, selecting a number of bonus markers from a collection of bonus markers, selecting a number of standard markers from a collection of standard markers, and triggering an activation of a first bonus selection when the number of bonus markers is at least a threshold number. During the first bonus selection, the method may include the steps of selecting a first predetermined number of markers from at least one of the collection of bonus markers and the collection of standard markers. When at least one additional bonus marker from the first predetermined number of markers is detected, the method may further comprise the step of initiating a second bonus selection. During the second bonus selection, the method may further comprise the step of selecting a second predetermined number of markers from at least one of the collection of bonus markers and the collection of standard markers. The method may further comprise the step of determining a sum of value associated with the selected number of bonus markers and the at least one additional bonus marker and may comprise the step of incrementing a credit balance by the sum.

BRIEF DESCRIPTION OF THE DRAWINGS

Reference will now be made to representative examples illustrated in the accompanying figures. It should be understood that the following descriptions are not intended to limit the examples to one or more preferred examples. To the contrary, they are intended to cover alternatives, modifications, and equivalents as may be included within the spirit and scope of the described examples as defined by the appended claims. Similar reference numbers have been used, where possible, to designate similar features that are common between the figures.

Figure 1:
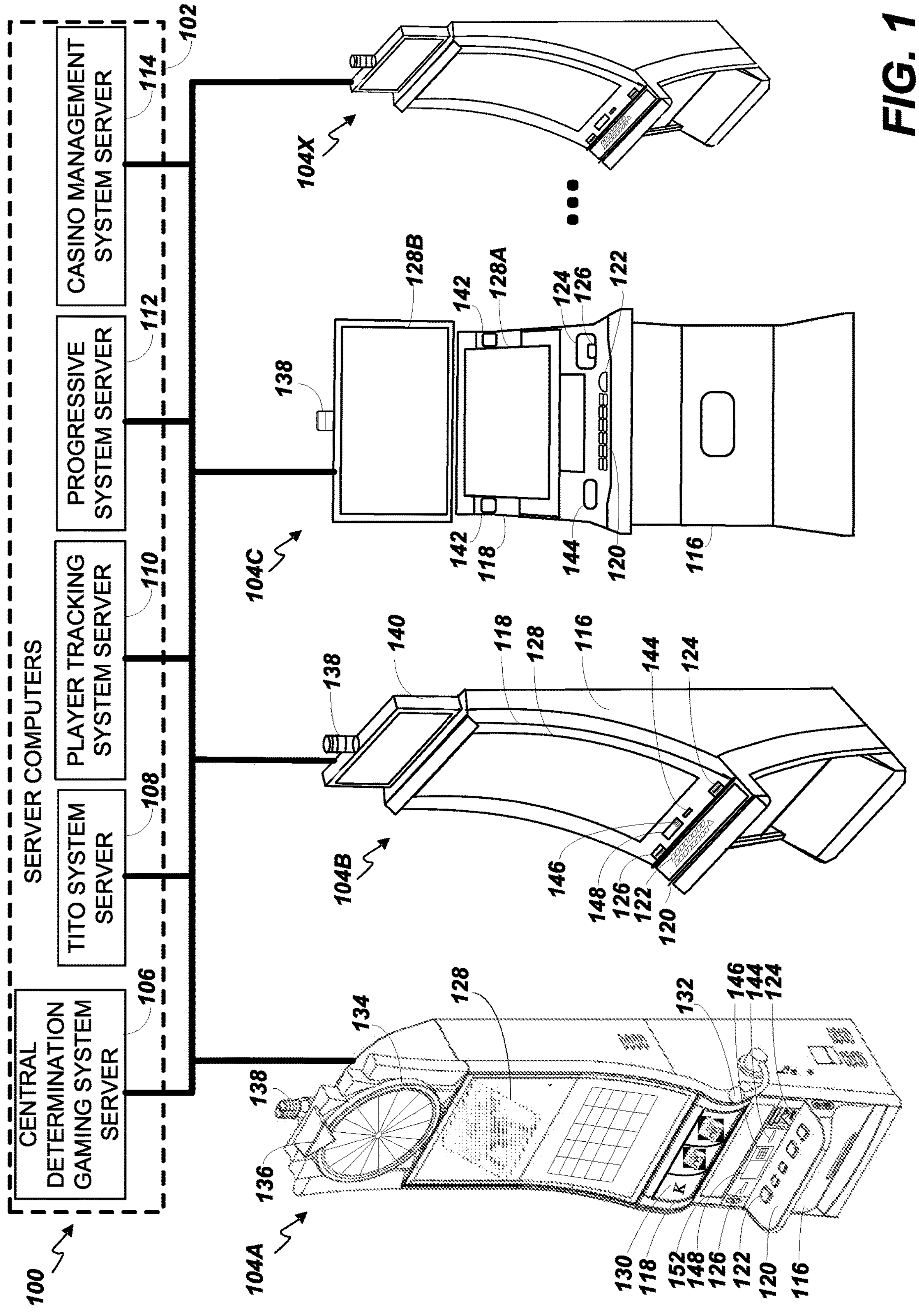
FIG. 1 is an exemplary diagram showing several electronic gaming machines (EGMs) networked with various gaming related servers.

The use of cross-hatching or shading in the accompanying figures is generally used to clarify the boundaries between adjacent elements and to facilitate legibility of the figures. Additionally, it should be understood that the proportions and dimensions (either relative or absolute) of the various figures and elements (and collections and groupings thereof), and the boundaries, separations, and positional relationships presented therebetween, are provided in the accompanying figures merely to facilitate an understanding of the various embodiments described herein, may not necessarily be presented or illustrated to scale, and are not intended to indicate any preference or requirement for an illustrated example to the exclusion of examples described with reference thereto.

DETAILED DESCRIPTION

The following disclosure relates to various apparatuses, systems, and methods related to electronic keno games, the improvement of electronic gaming machine (EGM) functionality, the game mechanics for providing alternate winning scenarios for a keno game, and associated features thereof. As will be explained in detail, an alternate winning scenario may refer to the selection of a number of bonus markers, where the bonus markers are distinct from traditional markers. When a threshold amount of the bonus markers are selected, an associated game controller may initiate a bonus draw phase and may select additional markers. At the conclusion of an electronic keno game, the selected bonus markers may be added together and the sum may be credited to a player's account.

As discussed herein, EGMs, and other electronic devices, may be used to implement a number of video-based games, including a video keno game. Keno-type games may be displayed to a player in the form of various symbols arrayed in a row-by-column grid or matrix, which may be referred to as a "keno card." The keno card may have several cells (e.g., 80 cells), with each cell being associated with a unique symbol or number (e.g., 1-80).

A keno game may include a standard winning scenario. For the standard winning scenario, a player may pick a certain number of symbols or numbers on the keno card (e.g., cells) and an associated game controller may randomly select and/or draw a standard set of markers as stored in an associated memory. The player may be rewarded according to the number of cells they selected that have a symbol or number matching one of the standard markers selected by the game controller. These matches may be referred to as "hits" and/or "catches." In certain implementations, a player may wager a certain amount of money or credits during play of the keno game. Based on a variety of factors, such as a number of hits, a wager amount, a game mode, and so on, a player may 'win' a certain amount of money or credits at the end of the keno game, depending on the player's success.

In accordance with the provided disclosure, a keno game may further include an alternative winning scenario in addition to, or instead of, the standard winning scenario described above. In addition to selecting from a standard set of markers, a game controller may select bonus markers from a bonus set of markers within an associated memory. The bonus set of markers may include numbers, values, or symbols. However, unlike the standard markers, the numbers, values, or symbols provided on the bonus markers may not match symbols or numbers provided on the keno card. As such, the bonus markers and the standard markers may be distinct in both appearance and content and may be interpreted differently by a game controller. In some cases, the numbers, values, or symbols provided on the bonus markers may include numbers present on the keno card. In such cases, the game controller may differentiate the bonus markers from the numbers on the keno card so that selected bonus markers do not trigger a 'hit' or 'catch.' This may be performed by distinguishing the bonus markers from the standard markers, such as visually, programmatically, or both.

During gameplay, a game controller may select a number of bonus markers along with a number of standard markers. After selection of the markers, the game controller may visually display the selected standard markers within a standard marker area. The game controller may further visually display the selected bonus markers within a bonus marker arca.

If the number of the selected bonus markers meets or surpasses a threshold value, the game controller may initiate a bonus draw phase. In some implementations, the threshold value may be referred to as a bonus trigger threshold and may be set by a game designer and/or operator of the keno game. For example, the game designer and/or operator may set the bonus trigger threshold value to the number six and, if the game controller selects six bonus markers during gameplay, the game controller may initiate the bonus draw phase. However, if the game controller selects less than six bonus markers, continuing the above example, the game controller may not initiate the bonus draw phase.

During the bonus draw phase, the game controller may select a predetermined number of additional standard markers and/or bonus markers. For example, in some implementations the game controller may initially select three additional markers during the bonus draw phase. The additional markers may be randomly selected from a group of markers (e.g., from a table representing unique markers) comprising both a set of stored standard markers and a set of stored bonus markers. For each additional standard marker that is selected during the bonus draw phase, the player has an additional chance to obtain a match (a "hit"). For each additional bonus marker that is selected during the bonus draw phase, the bonus draw phase may be restarted, a bonus pot may be increased, and/or a pay table may be changed.

For example, if a game controller selects additional bonus markers during the bonus draw phase, the game controller may reset the number of remaining selections to the predetermined number of initial bonus selections. For example, if one bonus selection is remaining and a bonus marker is selected, the game controller may reset a number of bonus selections to three (e.g., or any number of additional selections as established by a game designer). In this way, the bonus draw phase may continue, or be continuously reset, until a game controller selects three standard markers in a row. In some cases, the bonus draw phase may immediately end when the game controller selects an upper limit of bonus markers (e.g., 12), such as discussed herein.

When no selections are remaining, the keno game may end and a game controller may determine whether a player has obtained enough hits to 'win' and/or receive a payout. For example, if the player has picked ten symbols on a keno card, the player may win (e.g., receive a payout) if four or more hits are made. Depending on the number of hits, an associated pay table may determine how many credits are to be added to a player's account. If the player wins (e.g., receives a sufficient number of hits/matches) and if the bonus draw phase was activated during gameplay, the values depicted on each selected bonus marker may be added together and the sum of all selected bonus markers may be added to the player's payout. In this way, the player may receive additional opportunities to win larger sums. Additional features and operations of the disclosed material will be made apparent throughout the present disclosure.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that may implement one or more aspects of the present disclosure. The gaming devices 104A-104X may alternatively be portable and/or remote gaming devices such as, but not limited to, a smart phone, a tablet, a laptop, or a game console. Gaming devices 104A-104X may utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 may communicate over one or more communication networks, such as over the Internet through a website maintained by a computer on a remote server or over an online data network including commercial online service providers, Internet service providers (ISPs), private networks (e.g., local area networks (LANs) and enterprise networks), and the like (e.g., wide area networks). The communication networks could allow gaming devices 104A-104X to communicate with one another and/or the server computers 102 using a variety of communication-based technologies, such as radio-frequency (RF) (e.g., wireless fidelity (WiFi®) and Bluetooth®), cable TV, satellite links, and so on.

In some implementations, server computers 102 may not be necessary and/or preferred. For example, in one or more implementations, a stand-alone gaming device such as gaming device 104A, gaming device 104B or any of the other gaming devices 104C-104X may implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, and so on). For example, game outcomes may be generated on a central determination gaming system server 106 and may then be transmitted over the network to any of a group of remote terminals or remote gaming devices 104A-104X that utilize the game outcomes and display the results to the players.

A gaming device 104A is often of a cabinet construction which may be aligned in rows or banks of similar devices for placement and operation on a casino floor. The gaming device 104A may include a main door which provides access to the interior of a main cabinet 116. The gaming device 104A may further include a button area or button deck 120 accessible by a player that is configured with input switches or buttons 122, an access channel for a bill validator 124, and/or an access channel for a ticket-out printer 126.

In FIG. 1, the gaming device 104A is shown as a Relm XL™ model gaming device manufactured by Aristocrat® Technologies, Inc. As shown, the gaming device 104A is a reel machine having a gaming display area 118 comprising a number (typically 3 or 5) of mechanical reels 130 with various symbols displayed on them. The mechanical reels 130 may be independently spun and stopped to show a set of symbols within the gaming display area 118 and may be used to determine an outcome to a game.

In many configurations, the gaming device 104A may have a main display 128 (e.g., a video display monitor) mounted to, or above, the gaming display area 118. The main display 128 may be a high-resolution liquid crystal display (LCD), plasma, light-emitting diode (LED), organic light emitting diode (OLED) panel, which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket TITO system). In such cashless implementations, the gaming device 104A may also include a "ticket-out" printer 126 for outputting a credit ticket when a "cash out" button is pressed. Cashless TITO systems may be used to generate and track unique bar-codes or other indicators printed on tickets to allow players to avoid the use of bills and coins by loading credits using a ticket reader and cashing out credits using a ticket-out printer 126 on the gaming device 104A. The gaming device 104A may additionally have hardware meters for purposes including ensuring regulatory compliance and monitoring the player credit balance. In addition, there may be additional meters that record the total amount of money wagered on the gaming device, the total amount of money deposited, the total amount of money withdrawn, the total amount of winnings on gaming device 104A, and so on.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information may be provided in gaming device 104A. In such implementations, a game controller within the gaming device 104A may communicate with the player tracking system server 110 to send and receive player tracking information.

Gaming device 104A may also include a bonus topper wheel 134. When bonus play is triggered (e.g., by a player achieving a particular outcome or set of outcomes in the primary game), the bonus topper wheel 134 may be operative to spin and stop with indicator arrow 136 indicating the outcome of the bonus game. The bonus topper wheel 134 may be used to play a bonus game, but could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 may also be used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A may also include a handle 132 typically mounted to the side of main cabinet 116 which may be used to initiate gameplay.

Figure 2A:
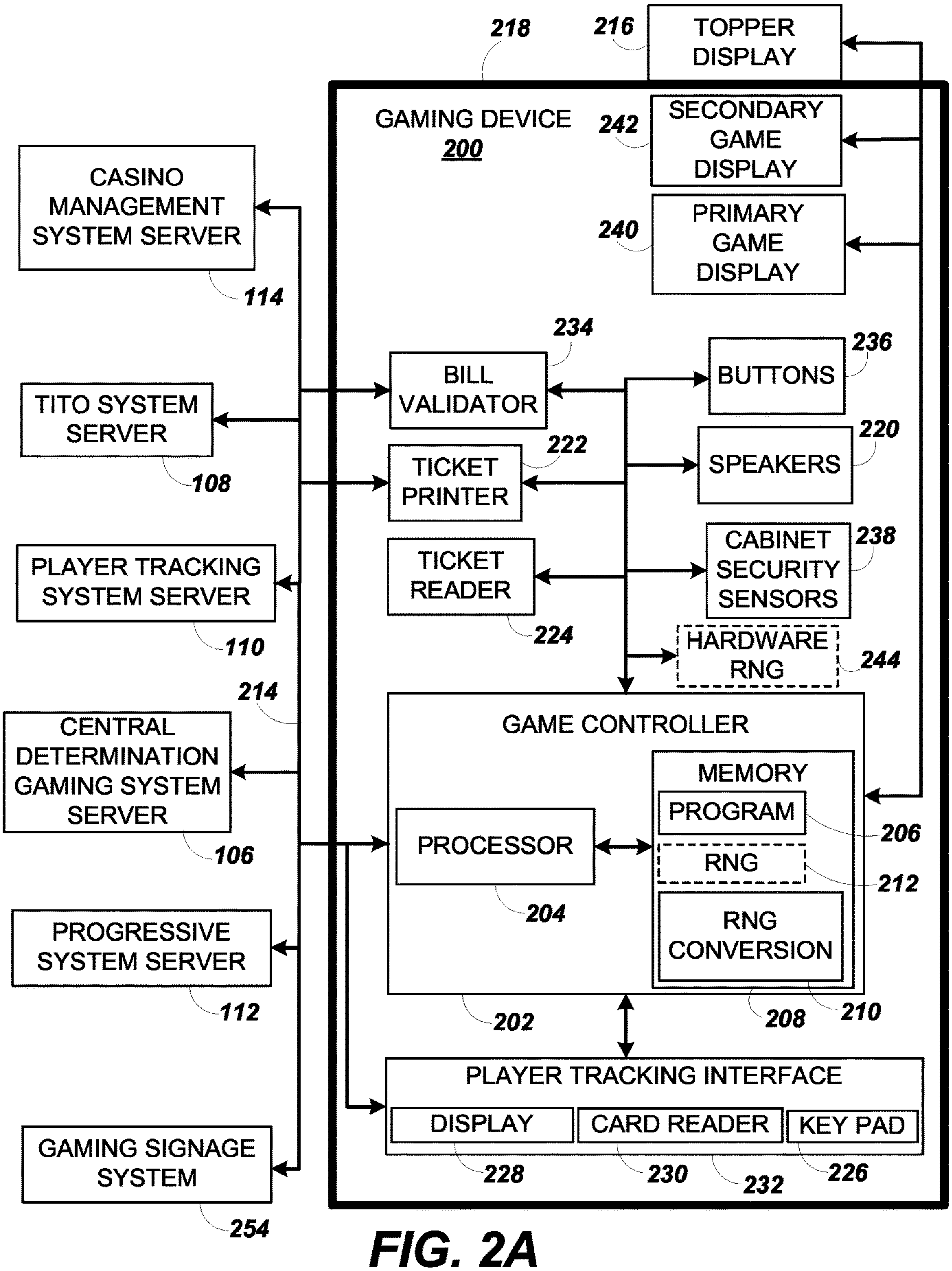
FIG. 2A is a block diagram showing various functional elements of an exemplary EGM.

Many or all the above described components may be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that, where possible, reference numerals identifying similar features of the gaming device 104A implementation are also identified in the gaming device 104B implementation using the same reference numbers. The gaming device 104B may not include physical reels and may instead show gameplay functions on a main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B may include a main cabinet 116 including a main door which opens to provide access to the interior of the gaming device 104B. The main or service door may be used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. The gaming device 104C may include a main display 128A that is in a landscape orientation. Although not illustrated by the front view provided, the main display 128A may have a curvature radius from top to bottom, or alternatively from side to side. In some implementations, the main display 128A may be a flat panel display. The main display 128A may be used for primary gameplay while a secondary display 128B may be used for bonus gameplay, to show game features or attraction activities while the game is not in play, or any other information or media desired by the game designer or operator. In some implementations, the example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and so on, and may be deployed for operation in Class 2, Class 3, and so on. The gaming device 104X may represent any kind of gaming device and may include components similar to those in depicted gaming devices 104A-104C.

FIG. 2A is a block diagram depicting exemplary internal electronic components of a gaming device 200 connected to various external systems. All or parts of the gaming device 200 shown could be used to implement any one of the example gaming devices 104A-104X depicted in FIG. 1. As shown in FIG. 2A, the gaming device 200 includes a topper display 216 or another form of a top box (e.g., a topper wheel, a topper screen, and so on) that sits above a cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. FIG. 2 also depicts utilizing a ticket printer 222 to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each display coupled to and operable under the control of a game controller 202.

The games available for play on the gaming device 200 may be controlled by a game controller 202 that includes a processor 204. The processor 204 may represent a general-purpose processor, a specialized processor intended to perform certain functional tasks, a combination thereof, and so on. As an example, the processor 204 may be a central processing unit (CPU) that has one or more multi-core processing units and memory mediums (e.g., cache memory) that function as buffers and/or temporary storage for data. Alternatively, the processor 204 may be a specialized processor, such as an application specific integrated circuit (ASIC), graphics processing unit (GPU), field-programmable gate array (FPGA), digital signal processor (DSP), or another type of hardware accelerator. In another example, the processor 204 may be a system on chip (SoC) that combines and integrates one or more general-purpose processors and/or one or more specialized processors. Although FIG. 2A illustrates that the game controller 202 includes a single processor 204, the game controller 202 is not limited to this representation and may include multiple processors 204 (e.g., two or more processors).

FIG. 2A illustrates that the processor 204 is operatively coupled to a memory 208. The memory 208 is defined herein as including volatile and/or nonvolatile memory and other types of non-transitory data storage components. Volatile memory is memory that does not retain data values upon loss of power. Nonvolatile memory is memory that does retain data upon a loss of power. Examples of the memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, a combination of any two or more of these memory components, and so on. In addition, examples of RAM include static random access memory (SRAM), dynamic random access memory (DRAM), magnetic random access memory (MRAM), and other devices. Examples of ROM include a programmable read-only memory (PROM), an erasable programmable read-only memory (EPROM), an electrically erasable programmable read-only memory (EEPROM), or other memory device. Even though FIG. 2A illustrates that the game controller 202 includes a single memory 208, game controller 202 could include multiple memories 208 for storing program instructions and/or data.

The memory 208 may store one or more game programs 206 that provide program instructions and/or data for carrying out various implementations (e.g., game mechanics) described herein. Stated another way, a game program 206 represents an executable program stored in any portion or component of the memory 208. In one or more implementations, the game program 206 is embodied in the form of source code that includes human-readable statements written in a programming language or machine code that contains numerical instructions recognizable by a suitable execution system, such as a processor 204 in a game controller 202 or other system. Examples of executable programs include: (1) a compiled program that may be translated into machine code in a format that may be loaded into a random access portion of a memory 208 and run by processor 204; (2) source code that may be expressed in proper format such as object code that is capable of being loaded into a random access portion of a memory 208 and executed by a processor 204; and (3) source code that may be interpreted by another executable program to generate instructions in a random access portion of a memory 208 to be executed by a processor 204.

Alternatively, a game program 206 may be set up to generate one or more game instances based on instructions and/or data that the gaming device 200 exchanges with one or more remote gaming devices, such as a central determination gaming system server 106 (not shown in FIG. 2A but depicted in FIG. 1). For purpose of this disclosure, the term "game instance" refers to a play or a round of a game that the gaming device 200 presents (e.g., via a user interface (UI)) to a player. The game instance may be communicated to the gaming device 200 via the network 214 and then displayed on gaming device 200. For example, the gaming device 200 may execute the game program 206 as video streaming software that allows the game to be displayed on the gaming device 200. When a game is stored on the gaming device 200, it may be loaded from the memory 208 (e.g., from a read only memory (ROM)) or from the central determination gaming system server 106 to the memory 208.

Gaming devices, such as the gaming device 200, are highly regulated to ensure fairness and, in some cases, the gaming device 200 is operable to award monetary awards (e.g., dispensed in the form of a redeemable voucher). Therefore, to satisfy security and regulatory requirements in a gaming environment, hardware and software architectures are implemented in the gaming device 200 that may differ from those of general-purpose computers. Adapting general purpose computers to function as gaming devices 200 may not be simple or straightforward because of: (1) the regulatory requirements for the gaming device 200, (2) the harsh environment in which the gaming device 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on the gaming device 200 generally involves complying with a certain level of randomness. Gaming jurisdictions may mandate that gaming devices satisfy a minimum level of randomness without specifying how a gaming device should achieve this level of randomness. To comply, FIG. 2A illustrates that the gaming device 200 may include a random number generator (RNG) 212 that utilizes hardware and/or software to generate RNG outcomes that lack any pattern. The RNG operations may be specialized and non-generic in order to comply with regulatory and gaming requirements. For example, in a slot game, the game program 206 may initiate multiple RNG calls to RNG 212 to generate RNG outcomes, where each RNG call and RNG outcome corresponds to an outcome for a reel. In another example, the gaming device 200 may be a Class 2 gaming device where the RNG 212 generates RNG outcomes for creating bingo cards. In one or more implementations, the RNG 212 could be one of a set of RNGs operating on the gaming device 200. More generally, an output of the RNG 212 may be the basis on which game outcomes are determined by the game controller 202. Game developers could vary the degree of true randomness for each RNG (e.g., pseudorandom) and utilize specific RNGs depending on game requirements. The output of the RNG 212 may include a random number or pseudorandom number (either is generally referred to as a “random number”).

In FIG. 2A, the RNG 212 and a hardware RNG 244 are shown in dashed lines to illustrate that the RNG 212, the hardware RNG 244, or both, may be included in the gaming device 200. In some implementations, instead of including the RNG 212, the gaming device 200 may include a hardware RNG 244 that generates RNG outcomes. Analogous to the RNG 212, the hardware RNG 244 may perform specialized and non-generic operations in order to comply with regulatory and gaming requirements. For example, because of regulation requirements, the hardware RNG 244 may be a random number generator that securely produces random numbers for cryptography use. The gaming device 200 may then use the secure random numbers to generate game outcomes for one or more game features. In additional or alternative implementations, the gaming device 200 may include both the hardware RNG 244 and the RNG 212. The RNG 212 may additionally or alternatively utilize the RNG outcomes from the hardware RNG 244 as one of many sources of entropy for generating secure random numbers for the game features.

Another regulatory requirement for running games on the gaming device 200 includes ensuring a certain level of Return to Player (RTP) payouts. Similar to the randomness requirement discussed above, numerous gaming jurisdictions may also mandate that a gaming device provides a minimum level of RTP (e.g., RTP of at least 75%). A game may use one or more lookup tables (also called weighted tables) as part of a technical solution that satisfies regulatory requirements for randomness and RTP. In particular, a lookup table may integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table may involve engineering decisions with respect to how RNG outcomes are mapped to game outcomes for a given game feature, while still satisfying regulatory requirements for RTP. Configuring a lookup table may also involve engineering decisions about whether different game features are combined in a given entry of the lookup table or split between different entries (for the respective game features), while still satisfying regulatory requirements for RTP and allowing for varying levels of game volatility.

FIG. 2A illustrates that the gaming device 200 includes a RNG conversion engine 210 that translates the RNG outcome from the RNG 212 to a game outcome presented to a player. To meet a designated RTP, a game developer may set up the RNG conversion engine 210 to utilize one or more lookup tables to translate the RNG outcome to a symbol element, stop position on a reel strip layout, and/or randomly chosen aspect of a game feature. As an example, the lookup tables may regulate a prize payout amount for each RNG outcome and how often the gaming device 200 pays out the prize payout amounts. The RNG conversion engine 210 may utilize one lookup table to map the RNG outcome to a game outcome displayed to a player and a second lookup table as a pay table for determining the prize payout amount for each game outcome. The mapping between the RNG outcome to the game outcome may partially or entirely control the frequency in hitting certain prize payout amounts.

FIG. 2A also depicts that the gaming device 200 is connected over network 214 to a player tracking system server 110. The player tracking system server 110 may be, for example, an OASIS® system manufactured by Aristocrat® Technologies, Inc. The player tracking system server 110 may be used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs may reward players for their play and may help build brand loyalty to the gaming establishment. The rewards typically correspond to the player's level of patronage (e.g., to the player's playing frequency and/or total amount of gameplays at a given casino). Player tracking rewards may be complimentary and/or discounted meals, lodging, entertainment and/or additional play. Player tracking information may be combined with other information that may be readily obtainable by a casino management system.

When a player wishes to play the gaming device 200, he/she may insert cash or a ticket voucher through a coin acceptor (not shown) or bill validator 234 to establish a credit balance on the gaming device. The credit balance may be used by the player to place wagers on instances of the game and to receive credit awards based on the outcome of winning instances. The credit balance may be decreased by the amount of each wager and may be increased upon a win. The player may add additional credits to the balance at any time. The player may also optionally insert a loyalty club card into the card reader 230. During the game, the player may view, with one or more user interfaces (UIs), the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In some games, the player may be asked to initiate or select options during course of gameplay (such as spinning a wheel to begin a bonus round or select various items during a feature game). The player may make these selections using the player-input buttons 236, the primary game display 240 which may be a touch screen, or using another device which enables a player to input information into the gaming device 200.

During certain game events, the gaming device 200 may display visual and auditory effects that may be perceived by the player. These effects may add to the excitement of a game, which may make a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (see FIG. 1).

When the player is done, he/she may cash out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 may include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment may include detecting the presence of mobile devices; performing credit, points, comps, or other marketing or hard currency transfers; establishing wagering sessions; providing a personalized casino-based experience using a mobile application; and so on. In some implementations, to perform these wireless operations, a wireless transmitter or transceiver may initiate a secure wireless connection between a gaming devices 104A-104X and/or 200 and a mobile device. After establishing a secure wireless connection between the gaming devices 104A-104X and/or 200 and the mobile device, the wireless transmitter or transceiver may not send and/or receive application data to and/or from the mobile device. Rather, the mobile device communicates with gaming devices 104A-104X and/or 200 may use another wireless connection (e.g., WiFi® or cellular network). In alternative or additional implementations, a wireless transceiver may establish a secure connection to directly communicate with the mobile device. The mobile device and gaming device 104A-104X and/or 200 may send and receive data utilizing the wireless transceiver instead of utilizing an external network. For example, the mobile device may perform digital wallet transactions by directly communicating with the wireless transceiver. In some implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and/or 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices may only have a single game display that includes only a mechanical set of reels and/or a video display, while others may be designed for bar counters or tabletops and have displays that face upwards. Gaming devices 104A-104X and 200 may also include other processors that are not separately shown. Using FIG. 2A as an example, a gaming device 200 may include display controllers (such as a game pad, keyboard, or button-based input, not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate case of description and explanation.

Figure 2B:
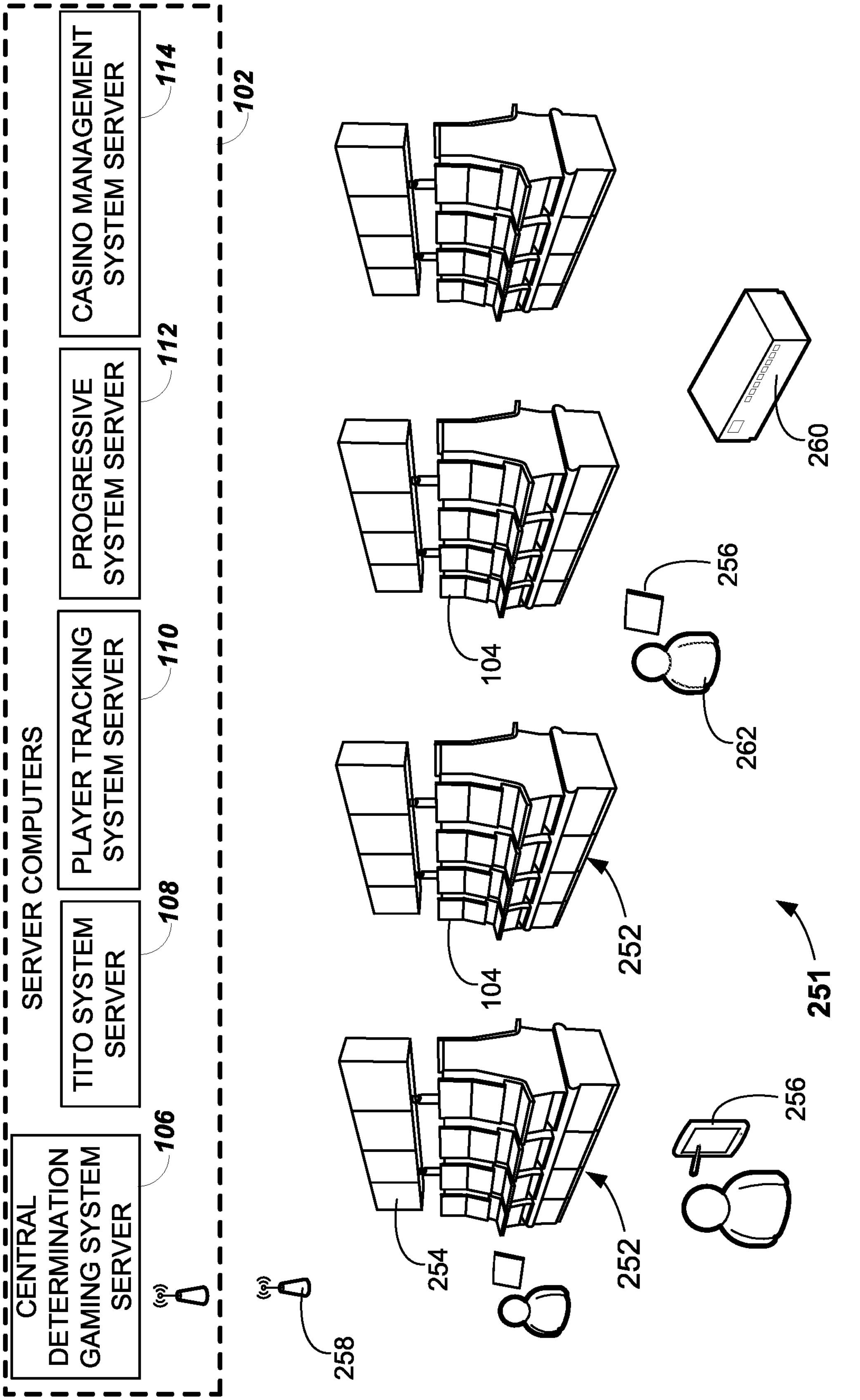
FIG. 2B depicts a casino gaming environment according to some examples.

FIG. 2B depicts a casino gaming environment according to one example. In this example, the casino 251 may include banks 252 of EGMs 104. In this example, each bank 252 of EGMs 104 may include a corresponding gaming signage system 254 (also shown in FIG. 2A). According to this implementation, the casino 251 may also include mobile gaming devices 256, which are also configured to present wagering games in this example. The mobile gaming devices 256 may, for example, include tablet devices, cellular phones, smart phones and/or other handheld devices. In this example, the mobile gaming devices 256 may be configured for communication with one or more other devices in the casino 251, including but not limited to one or more of the server computers 102, via wireless access points 258.

According to some examples, the mobile gaming devices 256 may be configured for stand-alone determination of game outcomes. However in additional or alternative implementations, the mobile gaming devices 256 may be configured to receive game outcomes from another device, such as the central determination gaming system server 106, one of the EGMs 104, and so on.

Some mobile gaming devices 256 may be configured to accept monetary credits from a credit or debit card, via a wireless interface (e.g., via a wireless payment app), tickets, a patron casino account, and so on. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash-out and/or cash-in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, a wireless interface (e.g., a wireless payment app), tickets, and so on. According to some examples, the kiosks 260 may be configured to accept monetary credits from a casino patron and may provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a “cash out” signal to a kiosk 260 via a wireless link in response to receiving a “cash out” indication from a casino patron. The kiosk 260 may provide monetary credits to the casino patron 262 corresponding to the “cash out” signal, which may be in the form of cash, a credit ticket, a credit transmitted to a financial account corresponding to the casino patron, and so on.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron’s player loyalty card, a patron’s smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming arca.

Figure 2C:
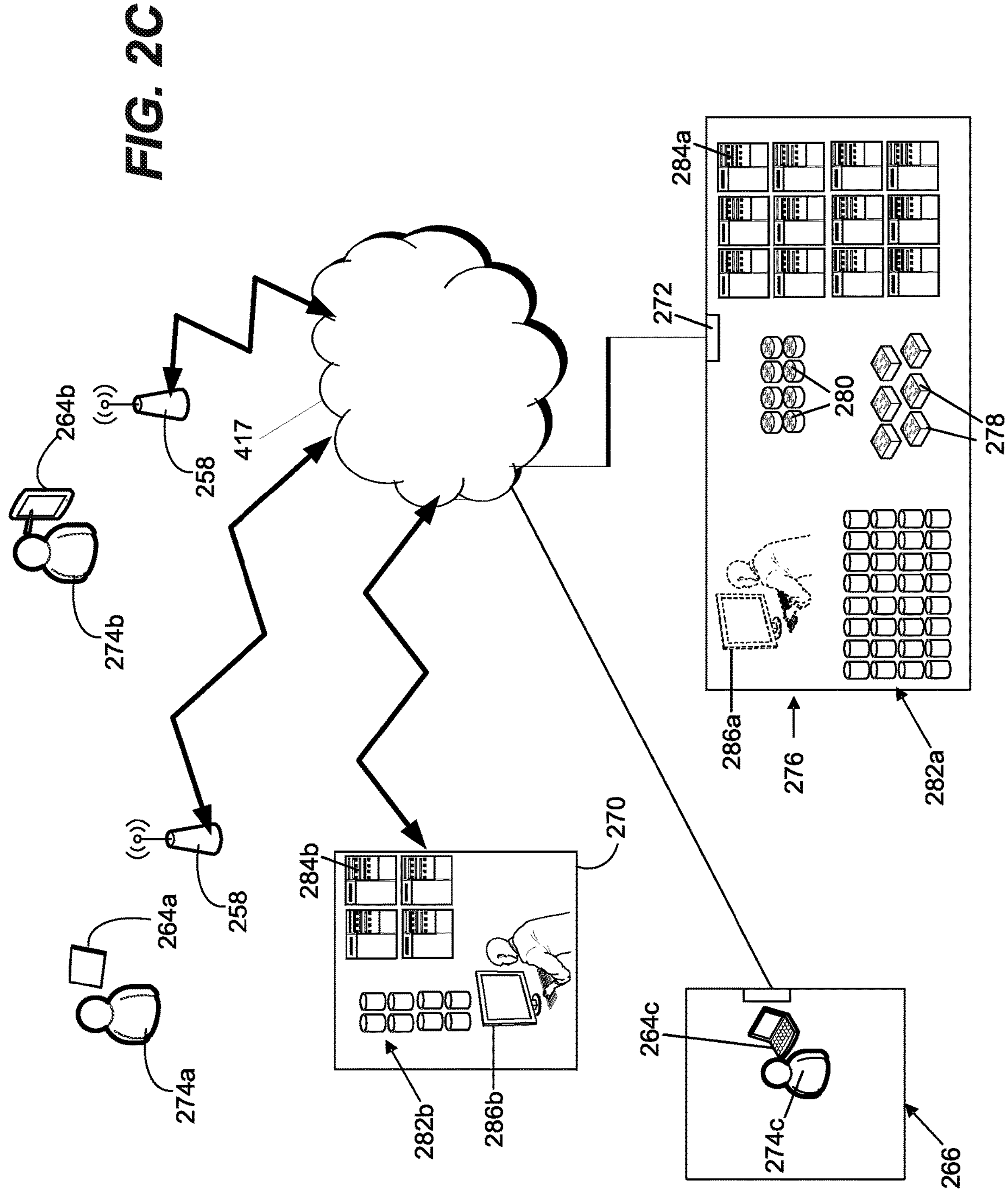
FIG. 2C is a diagram that shows examples of components of a system for providing networked/online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* may be capable of communication via one or more networks 417. The networks 417 may, for example, include one or more cellular telephone networks, the Internet, and so on. In this example, the EUDs 264*a* and 264*b* are mobile devices: where the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 may include various devices that are configured to provide online wagering games via the networks 417. The gaming data center 276 may be capable of communication with the networks 417 via the gateway 272. In this example, switches 278 and routers 280 may be configured to provide network connectivity for devices of the gaming data center 276, including storage devices 282*a*, servers 284*a*, and one or more workstations 286*a*. The servers 284*a* may, for example, be configured to provide access to a library of games for online gameplay. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 may include servers 284*b*, storage devices 282*b*, and one or more workstations 286*b*. According to this example, the financial institution data center 270 may be configured to maintain financial accounts, such as checking accounts, savings accounts, loan accounts, and so on. In some implementations, one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results, and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online gameplay, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as applications ("apps") and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
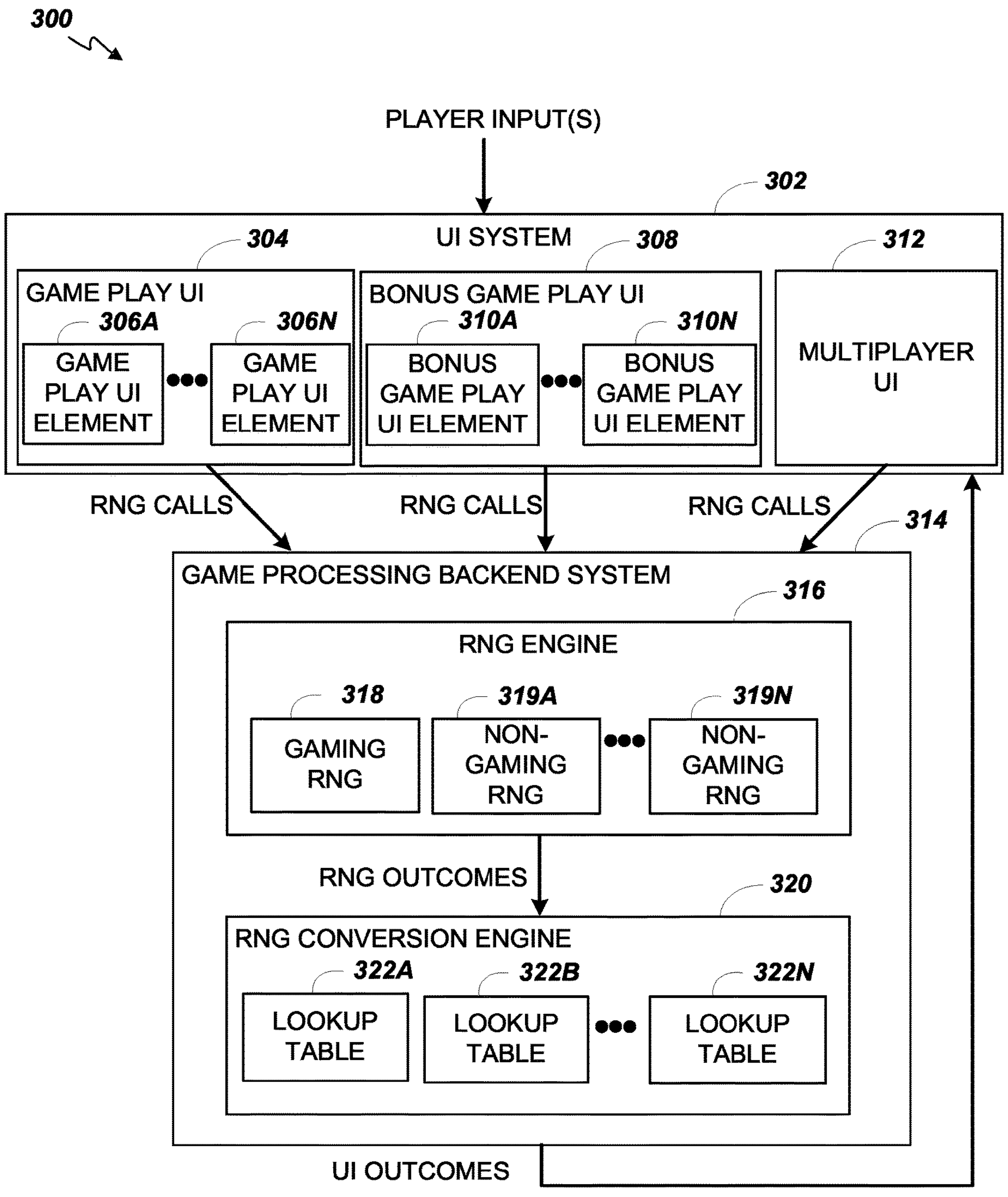
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a user interface (UI) system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 may implement the game processing pipeline using a gaming device, such as gaming devices 104A-104X and/or 200 shown in FIGS. 1 and 2, respectively. Alternatively, portions of the gaming processing architecture 300 may implement the game processing pipeline using a gaming device and one or more remote gaming devices, such as central determination gaming system server 106 shown in FIG. 1.

The UI system 302 may include one or more UIs that a player may interact with. The UI system 302 may include one or more gameplay UIs 304, one or more bonus gameplay UIs 308, and one or more multiplayer UIs 312, where each UI type includes one or more mechanical UIs and/or graphical UIs (GUIs). In other words, gameplay UI 304, bonus gameplay UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present gameplay to a player. Using FIG. 3 as an example, the different UI elements are shown as gameplay UI elements 306A-306N and bonus gameplay UI elements 310A-310N.

The gameplay UI 304 represents a UI that a player typically interfaces with for a base game. During a game instance of a base game, the gameplay UI elements 306A-306N (e.g., GUI elements depicting one or more virtual reels) may be shown and/or made available to a user. In a subsequent game instance, the UI system 302 may transition out of the base game to one or more bonus games. The bonus gameplay UI 308 may represent a UI that utilizes bonus gameplay UI elements 310A-310N for a player to interact with and/or view during a bonus game. In one or more implementations, at least some of the gameplay UI element 306A-306N are similar to the bonus gameplay UI elements 310A-310N. In additional or alternative implementations, the gameplay UI element 306A-306N may differ from the bonus gameplay UI elements 310A-310N.

FIG. 3 also illustrates that UI system 302 could include a multiplayer UI 312 purposed for gameplay that differs or is separate from the typical base game. For example, multiplayer UI 312 could be set up to receive player inputs and/or present gameplay information relating to a tournament mode. When a gaming device transitions from a primary game mode that presents the base game to a tournament mode, a single gaming device may be linked and synchronized to other gaming devices to generate a tournament outcome. For example, multiple RNG engines 316 corresponding to each gaming device may be collectively linked to determine a tournament outcome. To enhance a player's gaming experience, tournament mode may modify and synchronize sound, music, reel spin speed, and/or other operations of the gaming devices according to the tournament gameplay. After tournament gameplay ends, operators may switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 may generate RNG calls to a game processing backend system 314. As an example, the UI system 302 could use one or more application programming interfaces (APIs) to generate the RNG calls. To process the RNG calls, the RNG engine 316 may utilize a gaming RNG 318 and/or non-gaming RNGs 319A-319N. The gaming RNG 318 could correspond to a RNG 212 or a hardware RNG 244 as shown in FIG. 2A. As previously discussed with reference to FIG. 2A, the gaming RNG 318 often performs specialized and/or non-generic operations that comply with regulatory and/or game requirements. For example, because of regulation requirements, the gaming RNG 318 may correspond to the RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively or additionally, non-gaming RNGs 319A-319N may not be cryptographically secure and/or be computationally less expensive. The non-gaming RNGs 319A-319N may, thus, be used to generate outcomes for non-gaming purposes. As an example, non-gaming RNGs 319A-319N may generate random numbers for generating random messages that appear on the gaming device.

The RNG conversion engine 320 may process each RNG outcome from RNG engine 316 and may convert the RNG outcome to a UI outcome that is feedback to the UI system 302. With reference to FIG. 2A, the RNG conversion engine 320 may correspond to the RNG conversion engine 210 used for gameplay. As previously described, the RNG conversion engine 320 may translate the RNG outcome from the RNG 212 to a game outcome presented to a player. The RNG conversion engine 320 may utilize one or more lookup tables 322A-322N to regulate a prize payout amount for each RNG outcome and how often the gaming device pays out the derived prize payout amounts. In some examples, the RNG conversion engine 320 may utilize one lookup table to map the RNG outcome to a game outcome displayed to a player and a second lookup table as a pay table for determining the prize payout amount for each game outcome. In this example, the mapping between the RNG outcome and the game outcome may control the frequency in hitting certain prize payout amounts. Different lookup tables may be utilized depending on the different game modes, for example, a base game versus a bonus game.

After generating the UI outcome, the game processing backend system 314 may send the UI outcome to the UI system 302. Examples of UI outcomes may include symbols to display on a video reel or reel stops for a mechanical reel. In some examples, when the UI outcome is for a base game, the UI system 302 may update one or more gameplay UI elements 306A-306N, including, but not limited to, symbols, for the gameplay UI 304. In other examples, when the UI outcome is for a bonus game, the UI system may update one or more bonus gameplay UI elements 310A-310N (e.g., symbols) for the bonus gameplay UI 308. In response to updating the appropriate UI, the player may subsequently provide additional player inputs to initiate a subsequent game instance that progresses through the game processing pipeline.

In accordance with the provided disclosure, the gameplay UI 304 may include a keno card and the gameplay UI elements 306A-306N may be symbols that a player interacts with on the keno card (e.g., cells with numbers). After the user has selected a number of symbols on the keno card, the UI system 302 may generate RNG calls to the game processing backend system 314 to randomly select markers from one or more lookup tables 322A-322N. Prior to selection of the markers, the UI system 302 may determine how many markers are to be selected from a collection of standard markers and how many markers are to be selected from a collection of bonus markers. Separate RNG elements may be used within each collection. At certain stages of a keno game, markers may be randomly selected from a combination of the collection of standard markers and the collection of bonus markers, as described herein.

Figure 4:
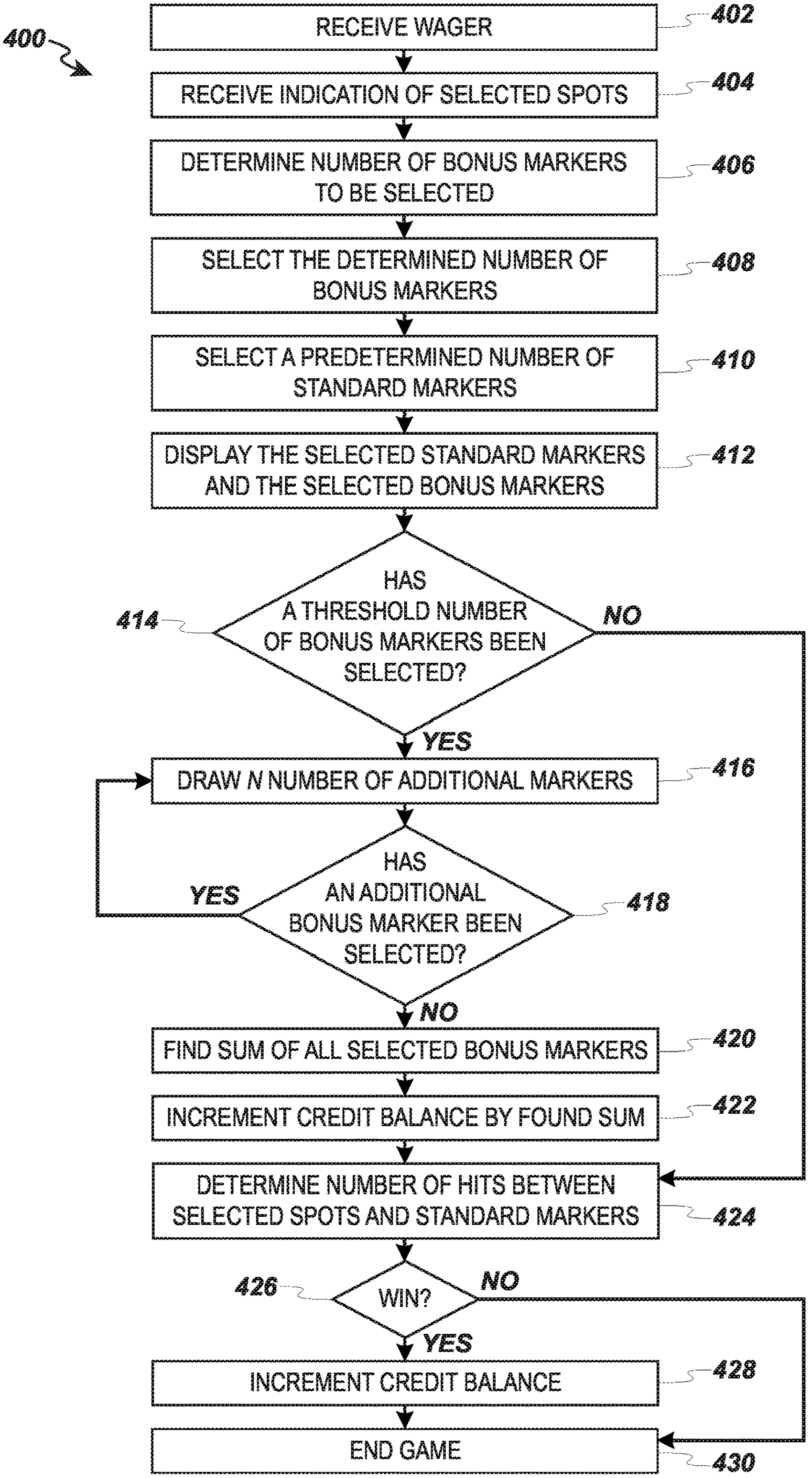
FIG. 4 is a flowchart showing a method for performing a keno game including a potential bonus draw phase as performed on, for example, an electronic gaming machine.

FIG. 4 is a flowchart showing a method 400 for implementing a standard, or base, game and a potential bonus game (e.g., a bonus draw phase) for an electronic keno game or other electronic game. The operations of the method 400 may be performed by a game controller (e.g., game controller 202) within a game processing architecture (e.g., game processing architecture 300).

At operation 402, a game controller may receive a wager from a player (e.g., the player may place a monetary wager from a credit balance established on an EGM). In some examples, a player may wager all or a portion of the credit balance. In some examples, a size of the wager may control an aspect of the electronic keno game including, but not limited to, a number of available spots on a keno card, a number of hits/matches required for a 'win' or winning condition, a payout size, and a number of markers selected by the game controller. For example, the number of selections a player makes on a keno card may be established by an amount that the player wagers. Continuing the above example, if a player wagers one credit, the game controller may permit selection of up to four cells on a keno card. In another example, if a player wagers ten credits, then the game controller may permit selection of up to ten cells on a keno card. The above examples are merely explanatory and any credit-to-selection ratio may be used. In some cases, the game controller may permit selection of a particular number of cells (e.g., 10) regardless of an amount wagered. In some cases, a maximum number of credits wagered may be limited to a certain threshold (e.g., '4'). In alternate or additional cases, a maximum number of credits wagered may only be limited by a credit amount possessed by a player (e.g., an unlimited wager).

After the game controller receives an indication of the wager, the player may select a number of spots, or cells, containing symbols and/or numbers on a keno card. As indicated at operation 404, the game controller may receive the indication of the selected spots and the number of selected spots as a player input. The player input may be received by, for example, a UI interface of an EGM; a touch sensitive display (e.g., main display 128); a switch or buttons (e.g., buttons 122); a button deck (e.g., button deck 120); a mobile device; and so on. As described above, in some instances, the number of selectable spots/symbols may be determined by an amount the player wagered at operation 402. In alternate or additional cases, the number of selectable spots/symbols may be determined by a player through a UI interface (e.g., the player may have the option to select any number of spots up to a predetermined number). In some cases, a game controller may automatically select the spots/symbols on the keno card through, for example, a quick pick UI element (e.g., spot quick pick button 628) within the UI interface after activation by the player.

At operation 406, the game controller may determine a number of bonus markers to be selected from a collection of bonus markers. In some cases, the number of bonus markers to be selected may be determined randomly by, for example, a RNG element (e.g., RNG 212). In some cases, the number of bonus markers may be determined on a marker-by-marker basis when the game controller selects markers individually and consecutively. For example, the game controller may establish a set chance for selecting a bonus marker (e.g., a 5% chance) and each marker to be drawn may have the set chance of being a bonus marker (e.g., each marker has a 5% chance of being a bonus marker). In alternative or additional cases, the game controller may establish overall chances for determining the number of bonus markers when the markers are selected as a group. For example, the game controller may establish a 5% chance of selecting one bonus marker, a 7% chance of selecting two bonus markers, and so on. It is noted that the provided chances are merely explanatory and any percent chance may be used in accordance with the provided disclosure.

Though operation 406 is depicted, in FIG. 4, as occurring after the game controller receives an indication of selected spots at operation 404 and before the game controller selects a predetermined number of standard markers at operation 410, the operation 406 may be performed at any time before operation 414. According to some examples, operation 406 (e.g., when the game controller determines a number of bonus markers to be selected) occurs before any markers are selected and may occur before an indication of selected spots is received as described with respect to operation 404.

Operations 408 and 410 may occur in any order and, in some cases, may occur concurrently. At operation 408, the game controller may select the number of bonus markers, where the number of bonus markers to be selected was determined in the preceding operation (e.g., operation 406). For example, if the game controller determined that four bonus markers are to be selected at operation 406, four bonus markers may be selected at operation 408.

The bonus markers may be selected from a collection, or pool, of bonus markers as stored in a memory (e.g., memory 208). As noted above, the collection of bonus markers may consist of symbols and/or credit values that do not correspond to spots on the keno card. In additional or alternative cases, the bonus markers may be visually distinguishable from other markers (e.g., standard markers) and may be presented with a different color (e.g., gold). In some cases, the bonus markers may comprise a jackpot indicator (e.g., major and minor) that may be associated with a jackpot award credit value. For example, a jackpot indicator labeled "MAJOR" may be associated with a jackpot award credit value of '1000' and a jackpot indicator labeled "MINOR" may be associated with a jackpot award credit value of '100.' In some cases, the "MAJOR" and "MINOR" jackpots may be linked to major and minor progressive jackpot awards and the associated progressive jackpot award credit value may be displayed to a player through a gameplay UI.

As used herein, a collection of bonus markers may include any number of markers with any number of indicators, including one or more "MAJOR" jackpot indicators, one or more "MINOR" jackpot indicators, one or more credit value indicators, or any indicators configured to affect or enhance, for example, a credit award. In preceding examples, the selected bonus markers awarding credit values may be added together after a bonus draw feature is triggered. As certain indicators may not correspond to credit values, these indicators may be ignored during the adding phase. In some examples, the indicators may be set to correspond to certain credit values. For example, a "MINOR" jackpot indicator may be established with a jackpot value of '100' credits, though this is only one example. In some examples, a "MAJOR" or "MINOR" indicator may be associated with a progressive jackpot credit value as indicated in a gameplay UI (see, e.g., FIG. 6). During gameplay, a "MAJOR" or "MINOR" jackpot award credit value may increase in accordance with, for example, the play of successive games and/or the placement of successive wagers (e.g., a progressive jackpot credit value may be incremented with a portion, or percentage, of each successive wager). Further to this example, a bonus marker may indicate an award multiplier (e.g., a 3× award multiplier) to be applied to the bonus draw feature award at the conclusion of the feature. Continuing this example, if the sum at operation 420 and/or operation 516 is 100 credits and the bonus markers selected also includes a bonus marker indicating a 3× award multiplier, the game controller may apply the 3× multiplier to the 100 credit award, incrementing the credit meter by 300 credits (e.g., at operation 422 and/or operation 518).

Figure 6:
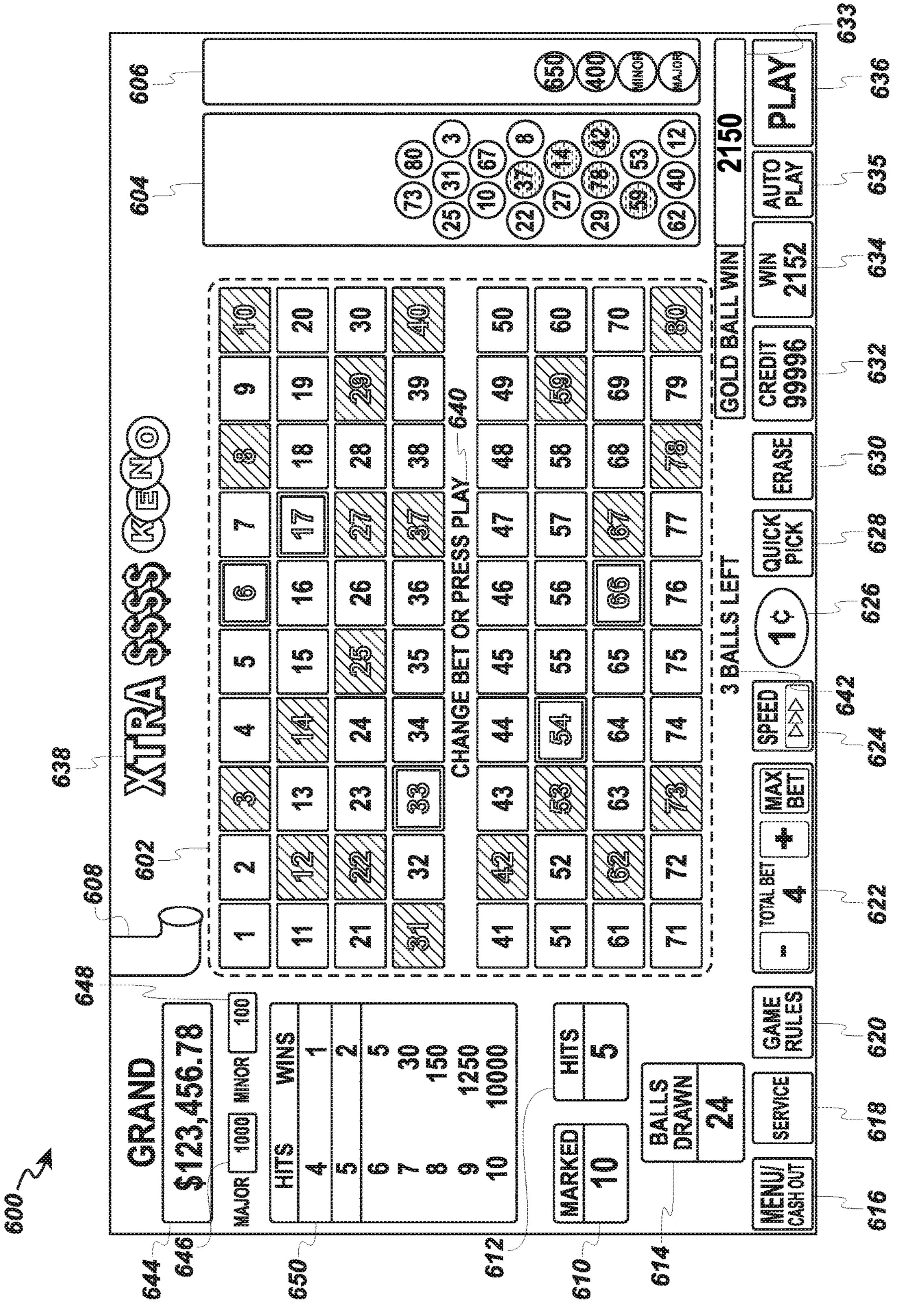
FIG. 6 depicts an example graphical user interface (GUI) of an example keno game as provided on a display of, for example, an EGM and as controlled by a game controller.

In some cases, a credit value associated with a jackpot indicator may change during the course of gameplay and may be indicated by a graphical element on an associated UI (sec, e.g., FIG. 6). For example, the "MAJOR" indicator may initially be assigned a credit value of '1000,' but may increase to a credit value of '5000' as gameplay progresses or in response to certain triggers (e.g., after a certain number of games has been played). Further, these jackpots may be capped at a certain value. For example, if the "MAJOR" jackpot starts with a credit value of '1000,' the "MINOR" jackpot may have a ceiling of '999' so as to not surpass the "MAJOR" jackpot under any circumstances. Likewise, the "MAJOR" jackpot may be capped at a certain credit value, such as at '9999.' Though specific credit values are discussed above, the provided credit values are solely for explanatory purposes and a jackpot indicator may be associated with any credit value.

In some cases, a bonus marker may comprise a credit value without an associated jackpot indicator. For example, a bonus marker may be assigned with any credit value such as '5,' '15,' '20,' and so on.

The collection of bonus markers may comprise completely unique credit values, such that each particular credit value is only present once within the collection of bonus markers, or may include any number of identical credit values (e.g., multiple markers with a credit value of '15' may be present). Any particular bonus marker may be equally likely to be selected as any other bonus marker.

In some cases, some or all of the bonus markers may include a symbol corresponding to a gameplay element (e.g., an award enhancing gameplay element). For example, a bonus marker may include a symbol of "2×" which may indicate that a multiplier of two will be applied to any credits won by the player after a winning condition has been met. In additional or alternative examples, a bonus marker may include an image or graphic which indicates that the game controller will select an additional marker or will initiate a feature game, such as a 'pick three' or other symbol matching feature game.

The selected bonus markers may be determined using a random number generator, as discussed in more detail above with respect to FIG. 3. In some cases, the game controller may select the bonus markers after a player has selected a 'PLAY' UI element of the UI region (see, e.g., FIG. 6). Selecting from a collection of bonus markers is one illustrative way of selecting bonus markers and other techniques may be used in accordance with this disclosure.

At operation 410, the game controller may select a predetermined number of standard markers from a collection, or pool, of standard markers stored in a memory (e.g., memory 208). As noted above, the standard markers may consist of symbols that correspond to, or otherwise match with, spots present on the keno card. If a selected standard marker corresponds to, or otherwise matches with, a selected spot on the keno board, the game controller may determine that a 'hit' and/or 'match' has occurred. In some cases, the collection of standard markers may comprise standard markers with unique symbols, each unique symbol corresponding to a matching symbol on spots of the keno board. In some cases, multiple standard markers may share identical symbols. The game controller may have an equal chance to select a particular standard marker from the collection of standard markers.

The set of standard markers may be determined using a random number generator, as discussed in more detail above with respect to FIG. 3. In some cases, the game controller may select the standard markers in response to a user selecting a 'PLAY' UI element of the UI region (sec, e.g., FIG. 6), signifying the start of a keno game. Selecting from a collection of standard markers is one illustrative way of determining selected standard markers and other techniques may be used in accordance with this disclosure.

As discussed above, the standard markers and the bonus markers may be selected consecutively (in any order), may be selected concurrently, and/or may be selected alternatingly.

In some cases, the game controller may select the standard markers and the bonus markers and may then display the selected markers in any order. As determined by a, for example, game designer of the keno game, a predetermined number of markers may be initially selected by a game controller.

In some cases, the same number of standard markers may be selected regardless of the number of selected bonus markers. As such, the bonus markers may not be subtracted from the determined number of standard markers to be selected and the same number of standard markers may be selected regardless of the determined number of bonus markers. For example, if four bonus markers are to be selected, the game controller may select 20 standard markers in addition to the four bonus markers. In another example, if six bonus markers are to be selected, the game controller may select 20 standard markers in addition to the six bonus markers.

In alternative cases, the game designer may direct the game controller to select 20 total markers for each individual keno game. In some cases, the determined number of bonus markers may be subtracted from the predetermined number of selections to determine how many standard markers are to be selected. Using the above example of 20 total markers to be selected, if, at operation 406, the game controller determines four bonus markers are to be selected, then 16 standard markers may be selected at operation 410 in addition to the determined four bonus markers.

At operation 412, the game controller may cause display of, via a UI, selected bonus markers and standard markers to a player, as depicted in, for example, FIGS. 6-10. In some cases, an animation may be presented to the player showing the selected markers move across the UI. In an example, selected markers may come from a pipe displayed on a gameplay UI (e.g., the selected markers may be animated as traveling through the pipe before exiting through an opening).

Figure 7A:
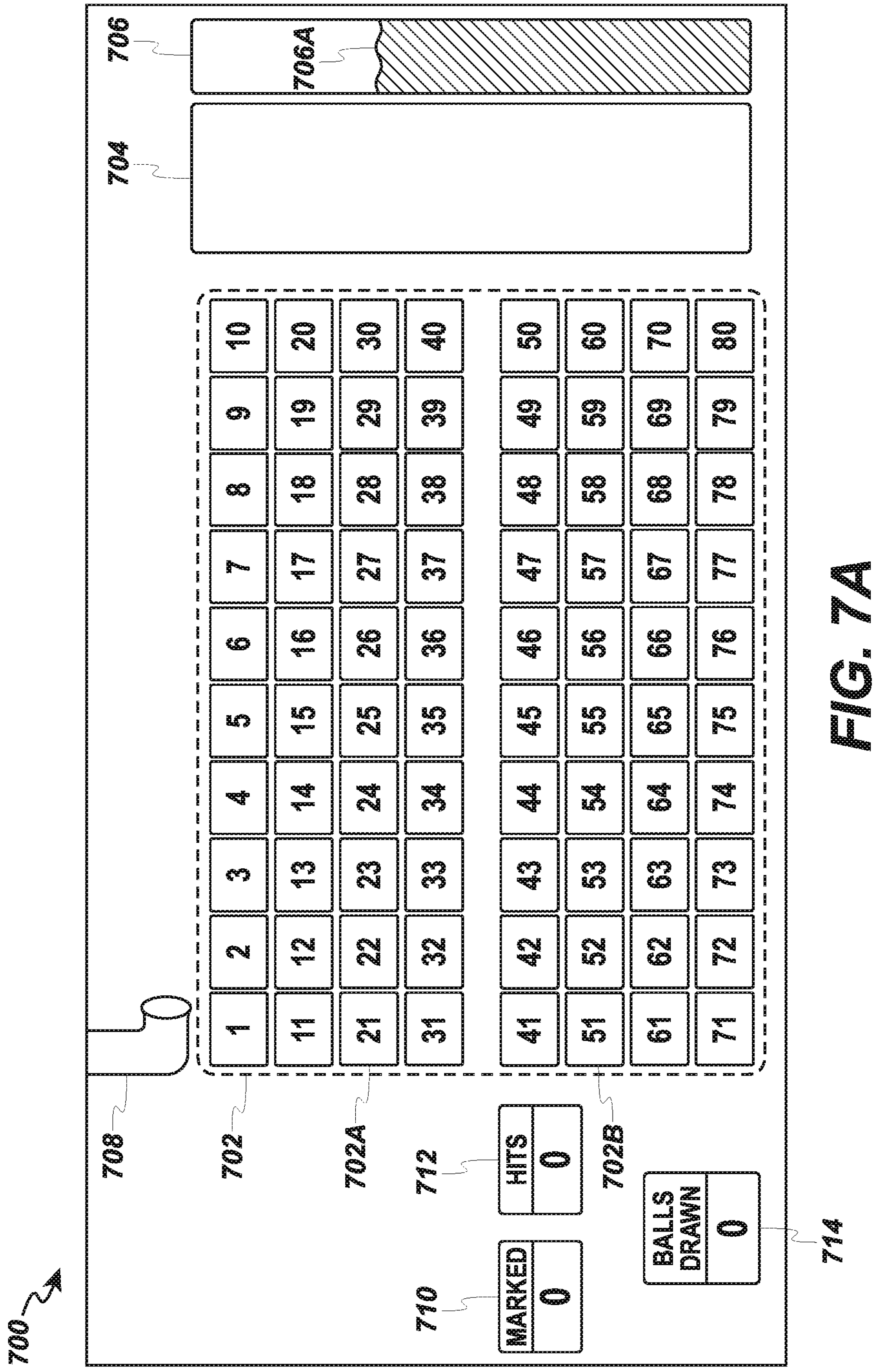
FIG. 7A depicts an example keno game including an electronic game board comprising a number of symbols arranged in a grid and some associated user interface components.

After the markers are initially displayed to the player, the selected markers may be presented in a UI area configured to hold markers of a particular type. With reference to FIG. 7A, a standard marker area 704 may hold and display selected standard markers and a bonus marker arca 706 may hold and display selected bonus markers. As will be discussed further in the disclosure, when a selected standard marker matches a spot selected by a player on a keno board (e.g., in operation 404), the game controller may cause an animation or graphical element to be displayed, the animation or graphical element signifying a 'hit' or a 'match.'

At operation 414, the game controller may determine whether a threshold number of bonus markers has been selected. As discussed herein, the threshold number of bonus markers may be a predetermined number selected by a game designer after which a bonus draw phase is activated. In a non-limiting example, the threshold number may be set to six. In such a scenario, whenever the game controller selects six or more bonus markers (e.g., at operation 408), the bonus draw phase may be activated. When the bonus draw phase is activated, the game controller may cause display of animations and/or graphical elements signifying the start of the bonus draw phase and/or may control associated physical elements, such as a buzzer or light. These UI elements may signify to the player that the bonus draw phase has been activated. In additional or alternative cases, any bonus phase may be activated in response to a sufficient number of bonus markers being selected.

If the threshold number of bonus markers has not been selected, as determined by the game controller at operation 414, the game controller may skip the bonus draw phase and the method 400 may proceed to operation 424, where the game controller determines a number of hits/matches, as discussed below.

If the threshold number of bonus markers has been met or surpassed, as determined by the game controller at operation 414, the game controller may initiate the bonus draw phase where an N number of additional markers are drawn, as depicted in operation 416. During the bonus draw phase, a UI element may display language such as "Bonus Draw Phase Initiated" and/or may display an N number of drawings/selections remaining, as predetermined by a, for example, game designer. For example, a game designer may establish that, during the bonus draw phase, the game controller selects three additional markers, though any number of additional markers to be selected may be established. The game controller may perform the selection during the bonus draw phase in response to a player input where, for example, a player may push a button on the UI, such as a 'draw' or 'play' button, to direct the game controller to select one, or more than one, additional marker at a time. In alternative or additional examples, the game controller may automatically select the N number of additional markers (e.g., three additional markers) in accordance with operations 416 and 418. A counter may additionally be provided, on any one of a UI or in a memory, to keep track of a number of selections remaining. The counter may be decreased by '1' whenever an additional standard marker is selected and may be reset to the N number of additional markers whenever an additional bonus marker is selected.

At operation 416, the game controller may select the additional markers from any, or all, of the collection of standard markers and the collection of bonus markers. The game controller may randomly select, in accordance with a RNG discussed above, any marker (standard or bonus) from the combined collection of standard markers and bonus markers that has not yet been selected in a preceding operation.

After the N number of additional markers has been selected, the game controller may determine whether an additional bonus marker was selected, as depicted in operation 418. If an additional bonus marker has been selected, then the game controller may reset a counter of selections remaining to the originally provided N number of additional selections, as discussed with respect to operation 416. See FIG. 5 and associated discussion for alternative methods of determining whether an additional bonus marker has been selected.

Continuing the above example, during the bonus draw phase, the game controller may select three additional markers. If at least one of those three additional markers is a bonus marker, the game controller may select three more markers and a counter associated with the selections remaining may be reset. This operation may continue until none of the three preceding selections have included a bonus marker (e.g., three selections in a row have been standard markers). In this way, at least three additional standard markers may be selected during the course of the bonus draw phase except, potentially, in certain scenarios where an upper limit of bonus markers is reached, as discussed later in the disclosure.

Operations 416 and 418 may continue for any number of bonus draw phases until operation 418 results in a 'NO' (e.g., no additional bonus markers have been drawn in the preceding N number of selections). That is, in accordance with the provided method 400, any number of bonus draw phases may be performed (e.g., a first bonus draw phase, a second bonus draw phase, and so on) until the condition at operation 418 results in a 'NO.'

In some cases, an upper limit may be established for a selected number of bonus markers. The upper limit may be set to any value at or above the threshold number of bonus markers. For example, if the threshold number of bonus markers is set to six, the upper limit may be set to twelve. When the selected number of bonus markers meets the upper limit, the bonus draw phase may be terminated and the method 400 may immediately move to operation 420. The upper limit may correspond to a visual condition where the selected bonus markers completely fill a bonus marker area (e.g., bonus marker area 606). In some cases, reaching the upper limit may result in a player winning a "GRAND" jackpot. The "GRAND" jackpot may be visually indicated on a gameplay UI (e.g., keno GUI 600 as depicted in FIG. 6) and may be a preset jackpot award value (e.g., 10,000 credits) or may be a progressive jackpot award. If a progressive jackpot award, the "GRAND" jackpot may increase during the course of successive keno games. When a player wins a "GRAND" jackpot award, a credit balance associated with the player may be incremented by a credit value or monetary value indicated by the "GRAND" jackpot. In some cases, after a "GRAND" jackpot is won, an indicated credit value or monetary value may be reset to an original value.

At operation 420, the game controller may find the sum of all bonus markers selected during any bonus draw phase and the initial selection of the bonus markers at operation 408. For example, if seven bonus markers have been selected in operations 408 and 416, then a sum of the seven bonus markers may be found. As described above, each bonus marker may be marked with a particular credit value (e.g., '10'). The credit values of each selected bonus marker may be added together to calculate the sum.

At operation 422, the game controller may increment a credit balance associated with the player of the keno game by the sum as found at operation 420. For example, if the sum at operation 420 is determined to be '100,' then the game controller may increment the credit balance by '100.' In some cases, operation 422 may not occur unless operation 426, as discussed below, results in a "YES" condition. In additional or alternative cases, operation 422 may occur regardless of the outcome at operation 426.

In some cases, the game controller may not increment a credit balance by a sum of all selected bonus markers unless a threshold number (e.g., six) of bonus markers has been selected during gameplay, as determined at operation 414.

That is, operation 422 may not be performed unless a bonus draw phase has been activated as indicated at operation 414. In additional or alternative cases, operation 422 may occur regardless of whether the threshold number of bonus markers has been selected at operation 414.

At operation 424, the game controller may determine a number of hits/matches between spots selected by a player on a keno card (or randomly selected by the game controller, as discussed above) and markers selected from the collection of standard markers. For example, if a player has selected the number '22' on a keno card and the game controller selected the standard marker '22' from the collection of standard markers, the game controller may determine that a hit, or match, has occurred. Likewise, if the player has selected the number '22' on the keno card and the game controller selected the marker '23' from the collection of standard markers, the game controller may determine that no hit, or no match, has occurred for that particular pair.

The process of determining the number of hits may be performed for each of the selected standard markers and each of the selected spots on the keno card. At operation 426, the game controller may determine whether the number of hits results in a winning condition. The winning condition may be established by a pay table and may require a certain number of hits and/or matches. If the required number of hits and/or matches is not met, the player may have been considered to have not met the winning condition and the keno game may end at operation 430.

If the required number of hits is either met or surpassed, then the game controller may consider the winning condition met. In some cases, there may be a number of winning conditions depending on a number of initial spots selected on a keno card and on a number of determined hits/matches. The game controller may query an associated pay table to determine an amount of credits the particular winning condition results in. At operation 428, the player's credit balance may be incremented by a value in accordance with the associated pay table (see discussion related to FIG. 2A, above). After the credit balance is incremented by a certain amount, the keno game may end at operation 430. If the player desires to play another round of the keno game, the player may place another wager, directing the game controller to restart at operation 402, or may otherwise direct the game controller to restart.

In some cases, the selected bonus markers may be persistent across multiple rounds of the keno game. For example, during a first round, a user may select a first number of spots and the method 400 may proceed as indicated in FIG. 4. If any bonus markers are selected during the first round, these bonus markers may remain in an associated area (e.g., bonus marker arca 706) for successive rounds (e.g., a second round, a third round, etc.). These previously selected bonus markers may remain even if the user selects a new number of spots. In the case of persistent bonus markers, the bonus markers may be deleted or reset to '0' whenever the threshold number of bonus markers has been selected. In some cases, the selected bonus markers may remain only for individual rounds and may be reset to '0' after a new round of the keno game begins, regardless of whether the threshold number of bonus markers has been selected within the round.

In some cases, the game controller may initiate a payout (e.g., in response to a player pressing a "Cash Out" button). The game controller may then print a ticket, for example, containing information such as a bar code and a credit/monetary amount. The player may take this ticket to an operator to 'cash out' or otherwise receive the currency value, or prize, associated with the ticket.

Figure 5:
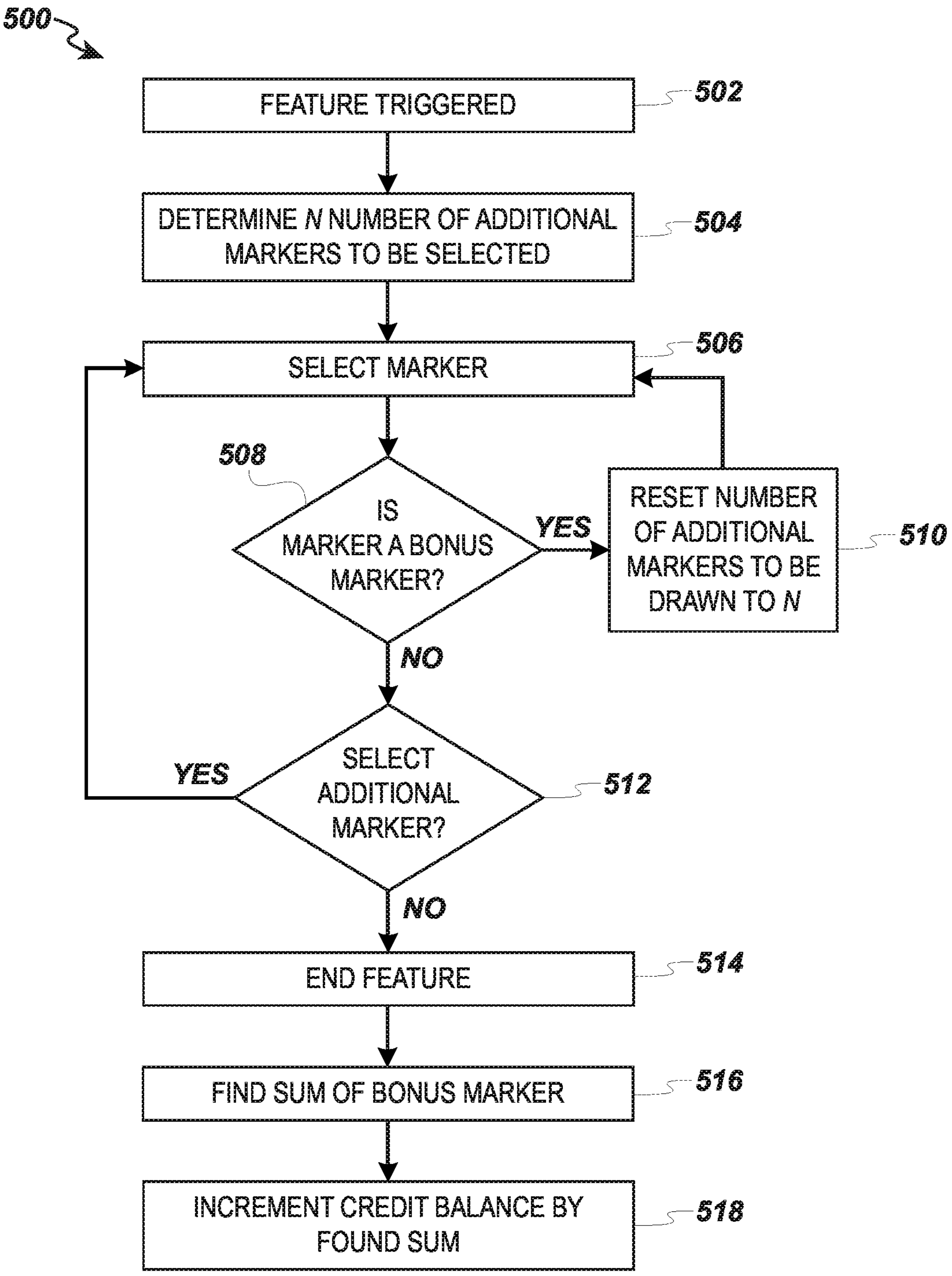
FIG. 5 is a flowchart showing a method for performing a bonus draw phase including operations related to a game controller selecting a number of bonus markers.

FIG. 5 is a flowchart showing a method 500 for a feature in accordance with the provided disclosure. The feature recited in FIG. 5 may refer to a bonus draw phase or feature and may be triggered in response to a game controller selecting a threshold number of bonus markers (see, e.g., FIG. 4 at operation 414). The method 500 as depicted in FIG. 5 may be used as an alternative to the similar features discussed with respect to FIG. 4. For example, FIG. 5 describes an individual marker-by-marker detection to determine whether a marker drawn during a bonus draw phase is a bonus marker and whether to reset an associated counter, continue selecting markers, or conclude the bonus draw phase. In contrast, operations 414-418 of FIG. 4 describe determining whether any of a group of markers drawn during a bonus draw phase is a bonus marker and resetting an associated counter when any of the selected markers are a bonus marker. Either of the disclosed operations for a bonus draw phase may be used in accordance with the provided disclosure.

At operation 502, the feature, such as the bonus draw phase or feature, may be triggered by a game controller in response to a condition of the keno game. In one example, the feature is triggered when a game controller selects a threshold number of bonus markers (e.g., six bonus markers) during a round of the keno game.

At operation 504, in response to the feature being triggered at operation 502, the game controller may determine an N number of additional markers to be selected. The N number of additional markers may be found by querying a documentation/computer code established by a game designer. For example, the documentation/computer code may establish that, during the bonus draw phase, three additional markers are to be selected, though N may be set to any value in other cases. A visual UI element (e.g., a counter 642) may be displayed on the gameplay UI (e.g., keno GUI 600) and may indicate a number of bonus selections remaining. The counter may also exist in a memory associated with the keno game to keep track of a number of bonus selections remaining in the bonus draw phase. For example, at the onset of the bonus draw phase, the counter may display "3 Draws Remaining." The counter may further reduce by '1' whenever a marker is drawn during the bonus draw phase.

At operation 506, the game controller may select a single marker from a collection of markers. The collection of markers may include both a collection of standard markers (e.g., markers which correspond to spots on a keno card) and a collection of bonus markers (e.g., markers displaying symbols and/or credit values which do not correspond to spots on a keno card). Each marker of the collection of standard markers and the collection of bonus markers may have an equal probability of being selected. In some cases, there may be different probabilities of selecting a particular marker from one of the collection of standard markers or the collection of bonus markers.

Once a marker is selected at operation 506, the controller may determine whether the selected marker is a bonus marker at operation 508. This may be determined by a flag associated with the marker (e.g., a flag indicating the marker is a bonus marker or a standard marker) or may be determined by a value/symbol associated with the marker.

If the marker is not a bonus marker, an associated counter may be decreased by '1' and the game controller may proceed to operation 512. If the counter reads '0,' the game controller may determine that the bonus draw phase has ended and may proceed to operation 514. If the counter reads any non-zero number, the game controller may initiate another selection at operation 506.

In the event that the game controller determines that the marker is a bonus marker at operation 508, the game controller may proceed to operation 510. At operation 510, the counter associated with the number of selections remaining may be reset to the initial value of N (e.g., three, in some cases) and an additional marker may be drawn at operation 506. The operations 506, 508, 510, and 512 may be performed any number of times depending on a value of a counter and based on whether a selected marker is a bonus marker. The feature ends when both 1) the previously selected marker is not a bonus marker; and 2) the counter indicates that 0 selections are remaining. This is indicated at operation 514, where the bonus draw feature ends. In some cases, as discussed above, the feature may end when the game controller has selected an upper limit of bonus markers. For example, if the upper limit is set to 12 and 12 bonus markers have been selected, the game controller may end the feature (e.g., at operation 514) regardless of a value indicated by the counter 642. As discussed above, reaching the upper limit may result in a grand jackpot being won.

At operation 516, the game controller may find the sum of the credit values of all bonus markers drawn during any operation of method 500. For example, if six bonus markers have been drawn, then a sum of the six bonus markers may be found. As described above, each bonus marker may be marked with a particular credit value (e.g., '10') and/or with a jackpot indicator. The credit values and any credit value associated with a jackpot indicator of each selected bonus marker may be added together to calculate the sum. As discussed with respect to FIG. 4, in some cases the game controller may only find the sum of the credit values of the selected bonus markers if a threshold value of bonus markers (e.g., six) has been selected.

In some cases, a bonus marker may contain an award enhancer, such as an additional marker selection, an award modifier, such as a multiplier, and/or a feature trigger, such as a trigger to initiate a bonus game such as a matching game. The award enhancer, award modifier, and/or feature trigger may be associated with a default credit value (e.g., '15') and/or may be associated with a credit value of '0.'

At operation 518, the game controller may increment a credit balance of a credit meter associated with the player of the keno game by the sum as found at operation 516. For example, if the sum at operation 516 is determined to be '100' credits, then the game controller may increment the credit balance by '100.'

FIG. 6 depicts an example keno GUI 600. As seen in FIG. 6, the example keno GUI 600 may include elements such as a title 638 (e.g., "XTRA $$$$ KENO"), a number of marker areas (e.g., a standard marker arca 604 and a bonus marker area 606), a keno card 602, a grand jackpot award 644, a major jackpot award 646, a minor jackpot award 648, a pay table 650, a ball dispersal element 608, a counter 642, an instruction indicator 640, a marking indicator 610, a hit indicator 612, a balls drawn indicator 614, a bonus marker win indicator 633, and/or a toolbar menu. The toolbar menu may include a number of graphical elements which may approximate the look of a button, such as a menu/cash out button 616, a service button 618, a rules button 620, a betting area 622, a gameplay speed button 624, a bet denomination indicator 626, a spot quick pick button 628, a spot erase button 630, a credit meter/indicator 632, a win amount indicator 634, an auto-play button 635, and a play button 636. Each of the areas, buttons, or indicators of the keno GUI 600 may be presented within the keno GUI 600 as a graphical element and may have any size, color, or shape. A player may interact with some or all of the areas, buttons, or indicators through any user input device including a keyboard, physical button, and/or touch-sensitive display. Some areas, buttons, or indicators may be configured solely to display information and may not detect a user input.

An example operation of the keno GUI 600, as discussed with respect to a player, will now be discussed. A player may interact with the keno GUI 600 via, for example, any of the EGMs discussed herein, through a computing device and via a network, or through any electronic display and associated system configured to display the keno GUI 600. Before the player interacts with the keno GUI 600, the keno GUI 600 may be displayed in a stand-by state. For example, a pre-recorded demo displaying operations of a keno game, words or phrases inviting a player to play the keno game (e.g., instruction indicator 640), animations configured to attract a player's attention, and so on, may be displayed in the stand-by state.

The player may begin interacting with the keno GUI 600 by pressing or otherwise interacting with any or some of the areas, buttons, or indicators. For example, before playing the keno game, the player may want to learn the rules of the keno game. The player may press, or otherwise interact with, the rules button 620. Once the rules button 620 has been pressed and/or activated, a rules screen displaying the rules of the keno game may be displayed as, for example, a pop-up window. The rules screen may include information similar to that described with respect to FIGS. 4 and 5, may include payout information, and/or may otherwise recite features of the keno GUI 600. If the player has questions about either the keno game or external factors, the player may press, or otherwise interact with, the service button 618. The service button 618 may alert facility staff and may direct a member of the staff to assist the player, either directly (e.g., in person) or virtually (e.g., via a pop-up window or alternative display).

If the player desires to play the keno game, the player may load a number of credits (via, for example, a casino-issued ticket) on an EGM, or similar device. In some cases, the player may insert currency (e.g., coins or bills) into the EGM. The credits or currency may result in the credit meter/indicator 632 updating to display the number of credits or currency loaded onto the EGM. In some cases, the player may interact with the menu/cash out button 616 to pull up a main menu. The main menu may include a cash out option where the player may cash out (e.g., remove credits from the EGM) and may include a number of other options such as display options, sound options, and so on.

At the beginning of the keno game, the player may select a predetermined number of spots on the keno card 602. In some cases, the player may select up to 10 spots. The player may select the spots by a touch-sensitive display or through other input mechanisms, as described herein. Whenever the player selects a particular spot (e.g., '17'), the spot may visually change to indicate that the spot has been selected. In some cases, the player may press or interact with a spot quick pick button 628 and a certain number of spots (e.g., 10 spots) on the keno card 602 may be randomly selected by a game controller. If the player has accidentally chosen a spot or wants to change a prior selection, the player may press or interact with a spot erase button 630. Activation of the spot erase button 630 may initiate an erase mode where an interaction with a spot on the keno board 602 deletes the selection of a previously marked spot instead of selecting the spot. The player may press or interact with the spot erase button 630 an additional time to terminate the erase mode when the player desires to select additional spots. In some instances, pressing the spot erase button 630 may erase all selected spots on the keno card 602. The marking indicator 610 may update in real-time to display the number of spots selected by the player or by the game controller, if the quick pick feature has been enabled.

At any time after credits have been loaded onto the EGM, the player may indicate a betting value through betting area 622. The betting area 622, as depicted in FIG. 6, may include a '+' and '-' symbol and may allow the player to increase or decrease a bet. In some cases, the maximum allowed bet may be capped at a certain number (e.g., '4'), though in alternative cases the maximum allowed bet may be uncapped. In cases where a maximum allowed bet is present, a "max bet" button may be provided. When the player presses or interacts with the "max bet" button, the game controller may immediately increase the total bet to a maximum value. In some cases, each credit may correspond to a monetary value indicated on a bet denomination indicator 626.

At any time during an interaction with the keno GUI 600, the player may press or interact with a gameplay speed button 624. The gameplay speed button 624 may have multiple modes and may control how fast operations of the keno GUI 600 and/or an associated game controller occur. For example, the gameplay speed button 624 may toggle through three different speed values (e.g., "slow," "standard," and "fast"). In the slowest setting, any animations, such as animations of markers being selected, or operations of the keno GUI 600 may be displayed at 0.5× speed. In the standard setting, the animations or operations may be displayed at 1× speed. In the fast setting, the animations or operations may be displayed at 2× speed. The above values are merely explanatory and any value, or number of different speed values, may be used.

When the player wants to begin the keno game, the player may press or interact with the play button 636. Activation of the play button 636 may cause a game controller to place a wager, reducing the credit meter/indicator 632 by the wager credit amount indicated by betting area 622 and to begin determining how many bonus markers to select and/or to begin selecting markers. In some cases, the player may press or interact with an auto-play button 635. Activation of the auto-play button 635 may result in the game controller automatically selecting a number of spots on the keno card 602, placing a wager, reducing the credit/meter indicator 632 by the wager credit amount, and so on. A speed at which markers are selected may be determined via the gameplay speed button 624. The selected markers may be animated as exiting from a ball dispersal element 608 and may move across the keno GUI 600 toward the standard marker area 604 and the bonus marker area 606. If a selected marker is a standard marker, the standard marker may be placed in the standard marker area 604. If the selected marker is a bonus marker, the bonus marker may be placed in the bonus marker area 606. In some cases, the initial selection phase may continue until the game controller selects 20 standard markers and places each marker in the standard marker arca 604.

A bonus marker win indicator 633 may additionally be provided. In some cases, the bonus marker win indicator may be positioned below the bonus marker area 606. The bonus marker win indicator may display the sum of markers presented within the bonus marker area 606. In the example depicted in FIG. 6, the displayed sum (2150) is the sum of bonus markers '650,' '400,' the minor jackpot ('100'), and the major jackpot ('1000').

Whenever the game controller determines that a hit has occurred, the hit indicator 612 may be updated in real-time to display the number of hits. Additionally or alternatively, a graphical depiction of at least one of a selected spot on the keno board 602 and/or the selected standard marker may be visually changed (e.g., displayed in a different color, shading, and/or size) to display either a hit or spot on the keno board 602 corresponding to the selected standard marker. In some cases, an audio signal (e.g., a "buzz") may accompany each hit. The balls drawn indicator 614 may additionally update in real time to correspond to each marker drawn.

After 20 standard markers have been selected, the number of selected bonus markers may be determined (though, in some cases, the number of selected bonus markers may be determined at any time). If the number of selected bonus markers reaches a threshold value, a bonus draw phase may be initiated. To accompany the initiation of the bonus draw phase, a graphical element may indicate that the bonus draw phase has started (sec, e.g., FIGS. 9A-9B). In some cases, the threshold value may be set to six such that the bonus draw phase is activated if six or more bonus markers are selected and displayed within bonus marker arca 606.

During the bonus draw phase, a counter 642 may indicate a number of bonus draws/selections remaining. For example, at the beginning of a bonus draw phase, the counter may indicate that 3 selections are remaining (e.g., "3 Balls Left"). As discussed herein, if an additional bonus marker is selected during the bonus draw phase, the counter 642 may be reset to '3.' Otherwise, if an additional standard marker is selected during the bonus draw phase, the counter 642 may decrease by the number of additional standard markers selected. Operations of the bonus draw phase are discussed herein.

Once the game controller determines that no more markers are to be selected, a number of credits won by the player may be determined. The number of credits may correspond to the pay table 650. For example, if four hits have occurred, the credits (or 'wins') won may be one credit. Continuing the example, the win amount indicator 634 may display or be incremented by one credit. In some cases, the number of wins may correspond to an equivalent credit value won during game play (e.g., a sum of the wins indicated in pay table 650 and the bonus marker win indicator 633).

In certain cases, as discussed herein, the player may win a grand jackpot, a major jackpot, and/or a minor jackpot. If the player wins any of these jackpots, as discussed herein, the player may be awarded with the grand jackpot award 644, the major jackpot award 646, and/or the minor jackpot award 648. In accordance with the displayed credit award, the credit meter/indicator 632 may be incremented by the indicated credit value and/or by a credit value associated with the indicated monetary value. At the conclusion of the keno game, the player may decide to cash out or may press or interact with the play button 636 to begin another keno game and/or round.

Though FIG. 6 is depicted in black-and-white, it is understood that any color, or color combination, may be used in accordance with the provided disclosure. Colors may be selected in accordance with UI design and may increase the attractiveness, or usability, of the keno game. Further, the keno game, as described above, is not restricted to any particular design. Any number of UI or graphical components may be used in accordance with the provided disclosure.

FIGS. 7A-9B depict example user interfaces (UIs) of a keno game as may be performed on an electronic gaming machine (EGM). For simplicity, FIGS. 7A-9B depict fewer graphical elements than those present in FIG. 6. However, FIGS. 7A-9B may, in operation, include any or all of the additional elements as depicted in FIG. 6.

FIGS. 7A-9B may depict the same, or similar, keno game at different stages, such as at a beginning-game phase, a mid-game phase, and an end-game phase. It should be understood that the UI images depicted in FIGS. 7A-9B are provided for exemplary purposes and any UI design may be used, including more, or fewer, buttons, animations, graphics, locations of UI elements, shapes of UI elements, and so on.

FIG. 7A depicts an example keno game, including a keno card, comprising a number of symbols arranged in two 4-by-10 grids. Though the symbols are arranged in 4-by-10 grids, any number of symbols may be provided within any row and column in accordance with a keno game. As depicted in FIG. 7A, the keno game UI 700 may include a keno card 702 comprising a top grid 702A and a bottom grid 702B. The top grid 702A may be separated from the bottom grid 702B by a space and, in some cases, the space may include words or phrases conveying information to a player of the keno game UI 700. For example, the space may include language such as "Insert Credits to Begin Play," may display a number of draws or selections remaining during gameplay, and so on. In some cases, the top grid 702A and the bottom grid 702B may appear as a single grid without any spaces therebetween.

The top grid 702A and the bottom grid 702B may comprise a set of unique symbols, such as a set of sequential numbers. As shown in FIG. 7A, the top grid 702A may sequentially display the numbers 1-40, with ten numbers per row, and the bottom grid 702B may sequentially display the numbers 41-80, also with ten numbers per row. In some cases, the number of sequentially displayed numbers per row may be different. Though numbers are provided in FIG. 7A, it should be appreciated that any unique symbols, such as letters or graphics, may be used instead of the depicted numbers in additional or alternative cases.

The keno game UI 700 may additionally include a standard marker area 704, a bonus marker area 706, a bonus trigger threshold 706A, a marking indicator 710, a hit indicator 712, a drawing indicator 714, and a ball dispersal element 708. The standard marker area 704 may be any UI element visually distinguishable from surrounding areas of the keno game UI 700. In an example, the standard marker area 704 may be bounded by lines, as depicted in FIG. 7A. A game controller controlling the keno game may place selected standard markers, as described herein, within the standard marker area 704 after the standard markers are selected and presented to a player of the keno game.

The bonus marker area 706 may be similar to the standard marker area 704 but may be configured to contain selected bonus markers instead of selected standard markers. In some cases, the bonus marker area 706 may have dimensions different from that of the standard marker area 704, though any dimensional configuration is possible. In some cases, the bonus marker area 706 may additionally appear in a different color or may be associated with a different graphic.

After a bonus marker is selected (see, e.g., operation 408 of FIG. 4), the game controller may place the selected bonus marker into the bonus marker area 706. The bonus marker area 706 may additionally contain a bonus trigger threshold 706A. The bonus trigger threshold 706A may appear as a shaded, hashed, and/or differently colored section of the bonus marker arca 706 and may visually indicate a threshold number of bonus markers that needs to be selected in order to trigger a bonus draw phase, in accordance with the provided disclosure. For example, the bonus trigger threshold 706A may be equivalent to the height of six selected bonus markers and may be met once six selected bonus markers are placed in the bonus marker area. A size or length of the bonus trigger threshold 706A may be set in accordance to the number of bonus markers needed to trigger a bonus draw phase. In some cases, the bonus marker area 706 may have a width slightly larger than a width of a displayed bonus marker, so that the selected bonus markers are stacked on top of each other (see, e.g., FIGS. 8 and 9A). An overall height of the bonus marker area 706 may correspond to an upper limit and may correspond to a maximum number of bonus markers that can be selected.

The ball dispersal element 708 may be a graphical element designed to disperse selected markers, as displayed to a player of the keno game through an animation. For example, the ball dispersal element 708 may appear as a pipe and selected markers may be animated as traveling through, and exiting from, the pipe. Once selected markers exit the ball dispersal element 708, the markers may be displayed to the player before traveling to a respective standard marker area 704 or bonus marker area 706. In some cases, the selected markers may be animated so that the markers appear to be getting larger, smaller, moving, or vibrating/flashing. Any animation technique, or lack thereof, designed to make the markers more easily discernable to a player may be used. Though depicted as a pipe, the ball dispersal element 708 may be any element and may, in some cases, be omitted.

The marking indicator 710 may display the number of spots that a player has marked on the keno card 702. For example, if a player selects a single spot (e.g., '24'), then the marking indicator 710 may display '1.' If the player selects two spots (e.g., '24' and '30'), then the marking indicator 710 may display '2.' The marking indicator 710 may be updated in real-time as a player marks, selects, or deselects spots on the keno card 702.

The hit indicator 712 may display the number of hits, or matches, between spots marked on the keno card 702 and standard markers selected by the game controller during gameplay. The hit indicator 712 may be updated in real-time and may be incremented along with, for example, an animation, such as flashing lights, or a sound, such as a whistle, to signify that a hit has occurred.

The drawing indicator 714 may display the number of markers drawn during gameplay of the keno game. The drawing indicator 714 may include a label (e.g., "Balls Drawn") and may be updated in real-time as a game controller selects markers. The drawing indicator 714 may include both standard markers and bonus markers selected during gameplay or may, in some cases, only include selected standard markers.

Each of the graphical elements described with relation to FIG. 7A may be placed at any portion within the keno game UI 700 and are not limited to the depicted positions. Further, any orientation of any graphical element may be used in accordance with the provided disclosure.

Figure 7B:
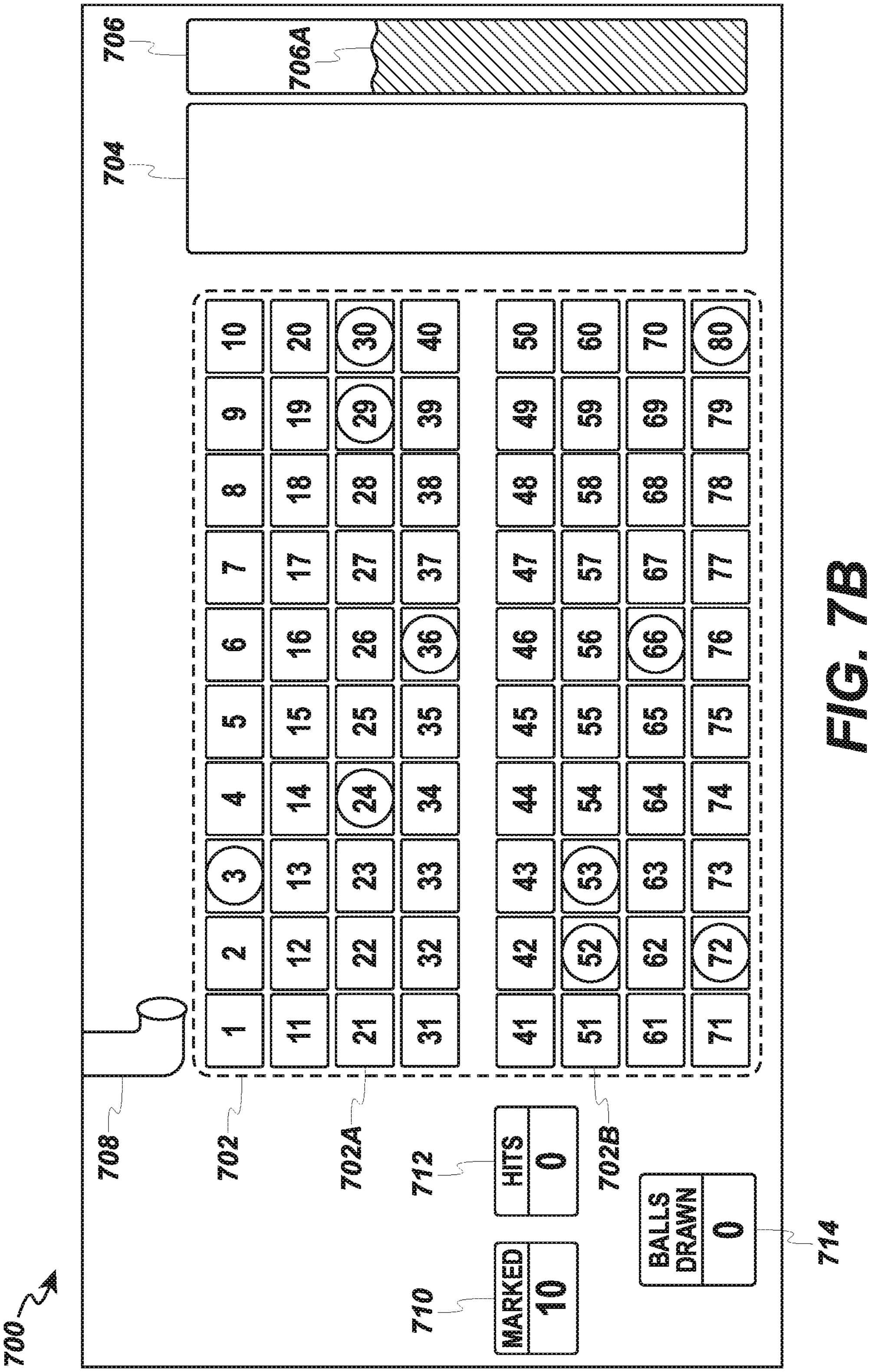
FIG. 7B depicts the example keno game of FIG. 7A after a player has selected a number of symbols on the electronic game board.

FIG. 7B depicts the keno game UI 700 of FIG. 7A at a time after a player has selected a number of spots on the keno card 702. In the example depicted in FIG. 7B, ten spots have been selected (e.g., '3,' '24,' '29,' '30,' '36,' '52,' '53,' '66,' '72,' and '80'). In some cases, ten spots may be the maximum number of spots that the game controller allows selection of. In alternative or additional cases, fewer or more spots may be selected, depending on particular settings of the keno game. As depicted, the marking indicator 710 may increment by the number of selected spots, in real-time. For example, when nine spots are selected, the marking indicator 710 may display '9' and when ten spots are selected, the marking indicator 710 may display '10.'

Figure 8:
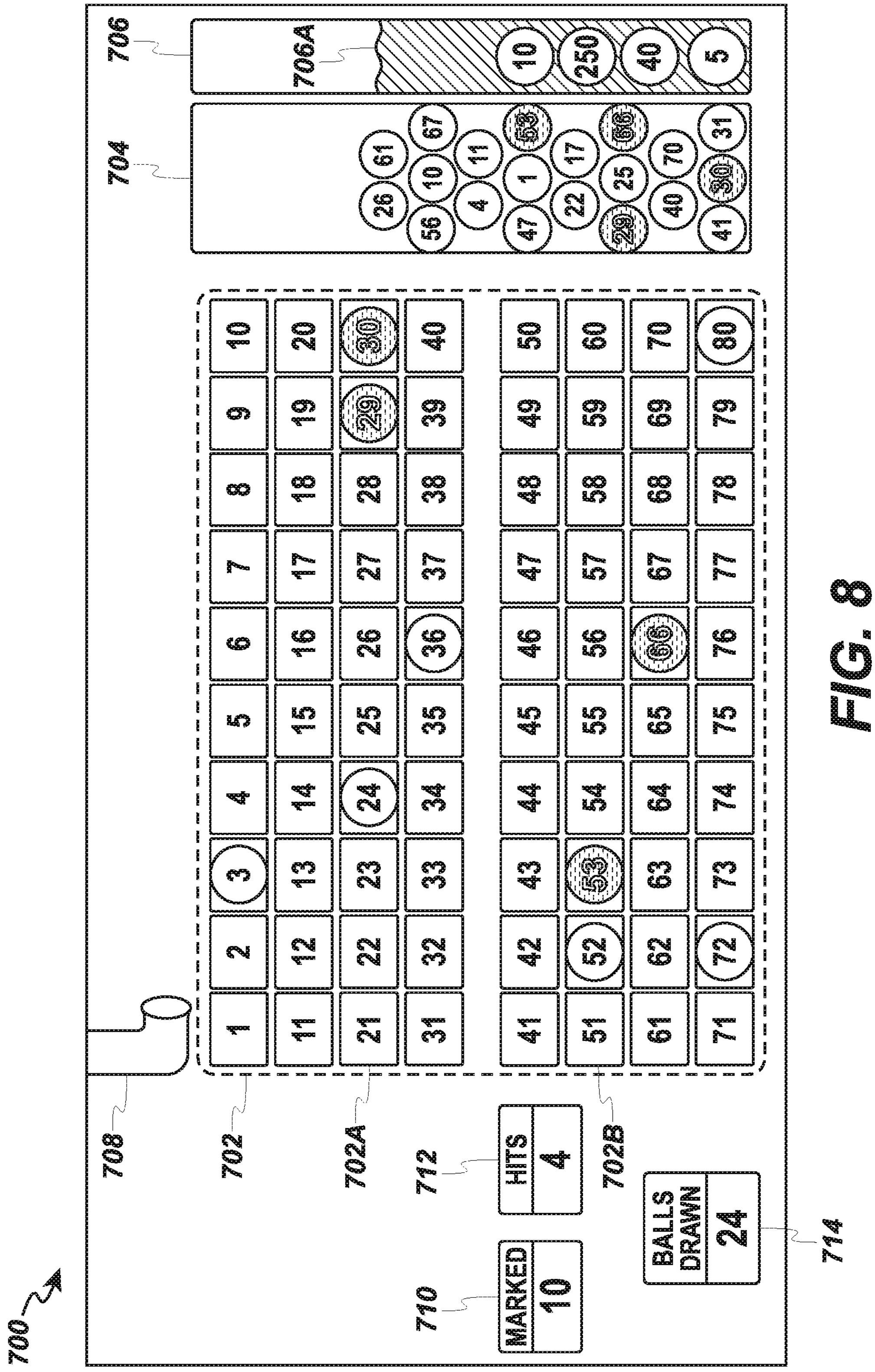
FIG. 8 depicts an example keno game after an associated game controller selects a number of markers from a collection of markers.

FIG. 8 depicts the keno game UI 700 (as described with respect to FIGS. 7A and 7B) after a game controller has selected a number of markers. As indicated by the drawing indicator 714, the game controller has selected twenty standard markers in addition to four bonus markers, though more or fewer markers may be selected in some cases. While the markers are being selected, an animation displaying the markers, as they are selected, may initiate. For example, as described above, the selected markers may be animated as moving from the ball dispersal element 708 to a right-side portion of the keno game UI 700. In some cases, an animation may be omitted so that no animation is played.

At some point after the markers are selected, the selected markers may be displayed within one of the standard marker arca 704, if the marker is a standard marker, or the bonus marker area 706, if the marker is a bonus marker. As depicted in FIG. 8, the selected standard markers may be arranged in a 3-2-3-2 pattern within the standard marker area 704 and the bonus markers may be arranged in a 1-1-1-1 pattern within the bonus marker arca 706, though any pattern may be used.

The selected standard markers may be selected from a collection of standard markers within a memory or table associated with an EGM running the keno game. Each marker may only be selected once and may have equal odds of being selected, though this is only one potential example. If any selected standard marker matches a spot marked by the player on the keno card 702, the selected standard marker and corresponding spot may be highlighted, shaded, displayed in a different color, and so on (sec, e.g., FIG. 8). Additionally, an animation concerning the hit/match may be provided within the keno game UI 700. In this way, hits between the selected standard marker and matching spot may be easily distinguishable by a player. In addition, the hit indicator 712 may increment by a value, in real-time, corresponding to the number of hits/matches.

In a similar fashion, each selected bonus marker may be placed within the bonus marker arca 706 (with or without an animation, as described with respect to selected standard markers). In the situation depicted in FIG. 8, the number of selected bonus markers may be below a threshold value as indicated by the bonus trigger threshold 706A. In this case, the selected bonus markers may merely be displayed within the bonus marker arca 706 without affecting gameplay of the keno game. In accordance with a keno gameplay table, the number of hits indicated by hits indicator 712 may result in a payout (e.g., a winning condition) or may result in no payout (e.g., a losing condition).

In some cases, the total number of standard markers (e.g., balls) selected may be equal to a predetermined number (e.g., 20), such as depicted in FIG. 8. In alternative cases, the total number of markers (e.g., standard markers and bonus markers) selected may be equal to a predetermined number (e.g., 20) such that any selected bonus marker reduces the number of selected standard markers by one.

Figure 9A:
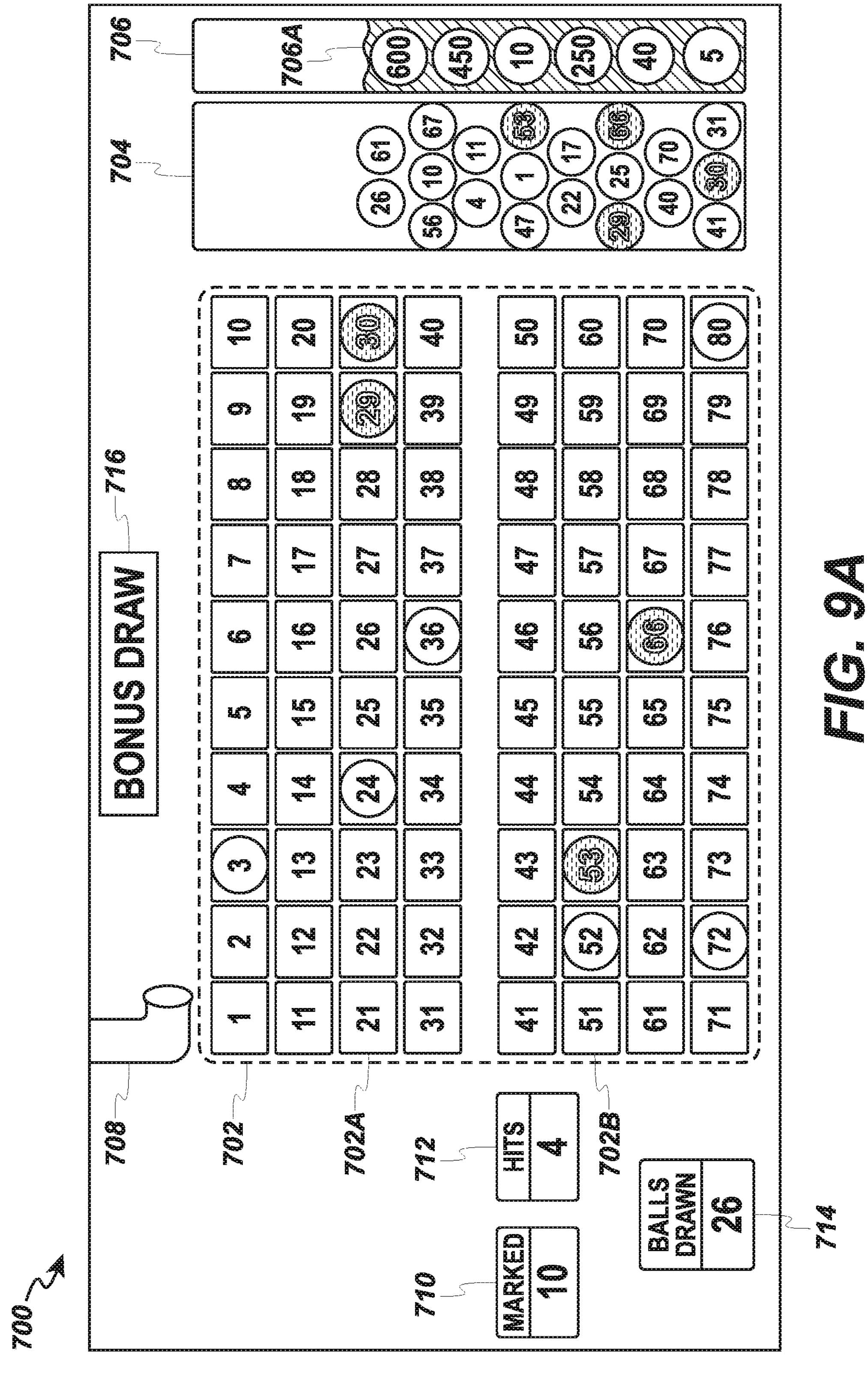
FIG. 9A depicts an example keno game after an associated game controller selects at least a threshold number of bonus markers.

FIG. 9A depicts the keno game UI 700 in an instance when a bonus draw feature has been activated. The keno game UI depicted in FIG. 9A is substantially similar to that depicted in FIG. 8 except that the number of selected bonus markers has met the bonus trigger threshold 706A. In response to this threshold being met, a graphical element 716 (e.g., an element displaying the phrase "BONUS DRAW") may be provided within the keno game UI 700 and may be visually displayed to the user. The bonus draw functionality is described with respect to FIGS. 4 and 5, above.

Ordinarily, if the bonus draw feature is not triggered, the number of selections or draws remaining may be '0' after a predetermined number of standard markers is selected (e.g., after 20 standard markers are selected). However, when the selected number of bonus markers meets or surpasses a bonus trigger threshold 706A, a game controller may activate a bonus draw feature. In response to the activation of this feature, a certain number of additional markers may be selected. For example, in some cases three additional markers may be selected. Following this example, the three additional markers may be selected from any of a collection of standard markers or a collection of bonus markers. In addition, each marker remaining may have equivalent odds of being selected. When the bonus draw feature is activated, a phrase and/or counter indicating the number of selections remaining may be presented somewhere within the keno game UI 700 (not depicted).

Figure 9B:
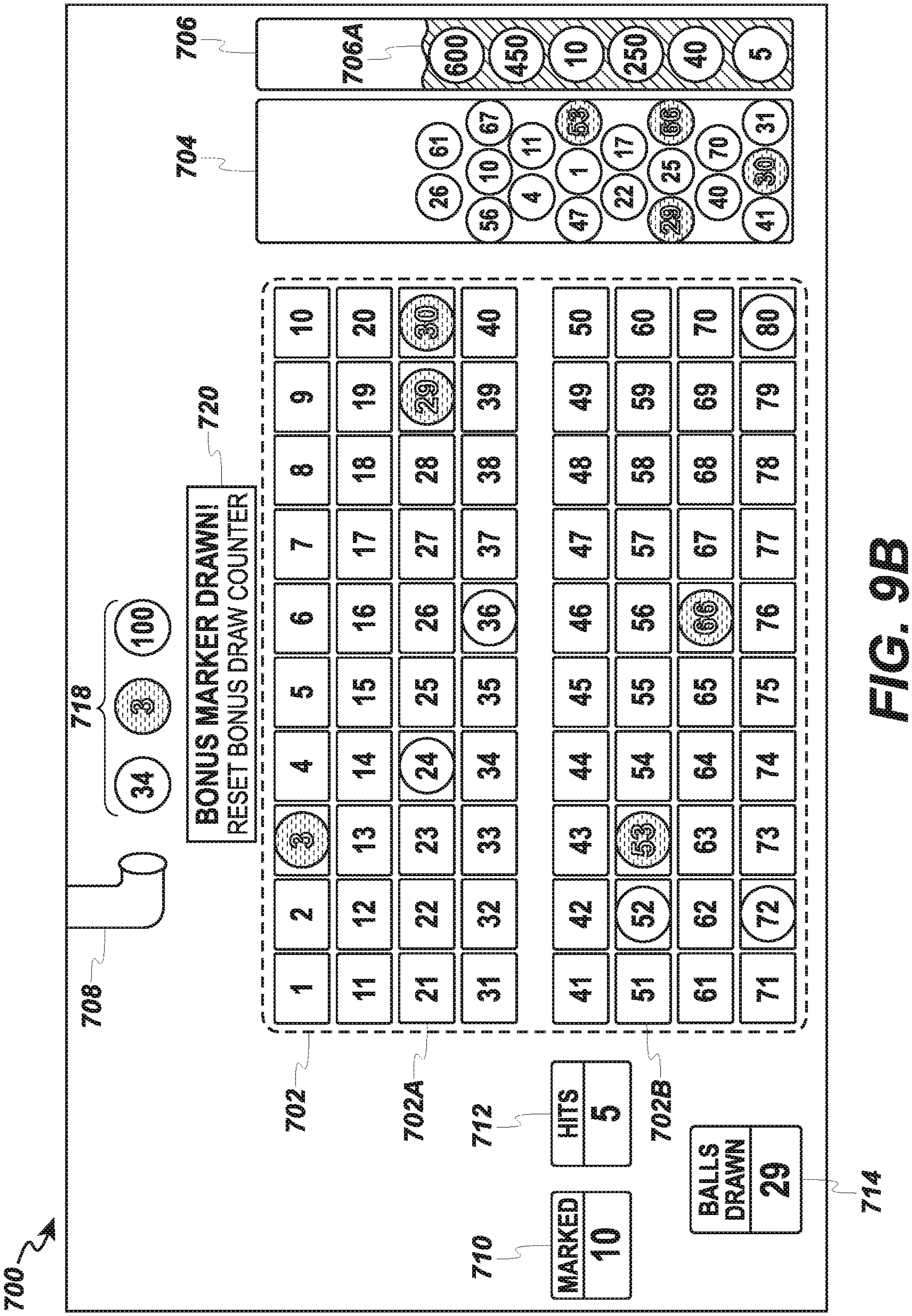
FIG. 9B depicts an example keno game during a bonus draw phase triggered after at least the threshold number of bonus markers is selected, as depicted in FIG. 9A.

FIG. 9B illustrates three additional markers 718 (e.g., '34,' '3,' and '100') selected during the bonus draw phase. As indicated by the drawing indicator 714, the three additional selected markers may increment the drawing indicator 714 updating the number of markers drawn. In addition, both the standard marker area 704 and the bonus marker area 706 may be updated with their respective newly selected markers.

In the example depicted in FIG. 9B, an additional bonus marker (e.g., '100') has been selected. This marker may be visually distinguishable from the standard markers by being a different shape, color, size, and so on. In some cases, the bonus markers may be depicted in a gold color and the standard markers may be depicted in a white color. If any of the additional markers 718 is a bonus marker, a graphical element 720 may be displayed indicating to a user that the bonus draw counter has been reset. In such a situation, the game controller may select, continuing the example, three additional markers.

Continuing the above example, one of the three additional markers (marker '3') matches a selection indicated on the keno card 702. In response to this additional hit/match, the hit indicator 712 may be incremented by '1' to indicate that an additional hit has occurred. Likewise, the marked spot '3' on the keno card may be visually updated to indicate that a hit has occurred. In some example, an additional UI element may be displayed indicating that an additional hit has occurred during the bonus draw phase.

In the event that no bonus marker is present in the additional markers 718, the bonus draw feature may end, no additional markers may be selected, and the keno game may conclude.

Figure 10:
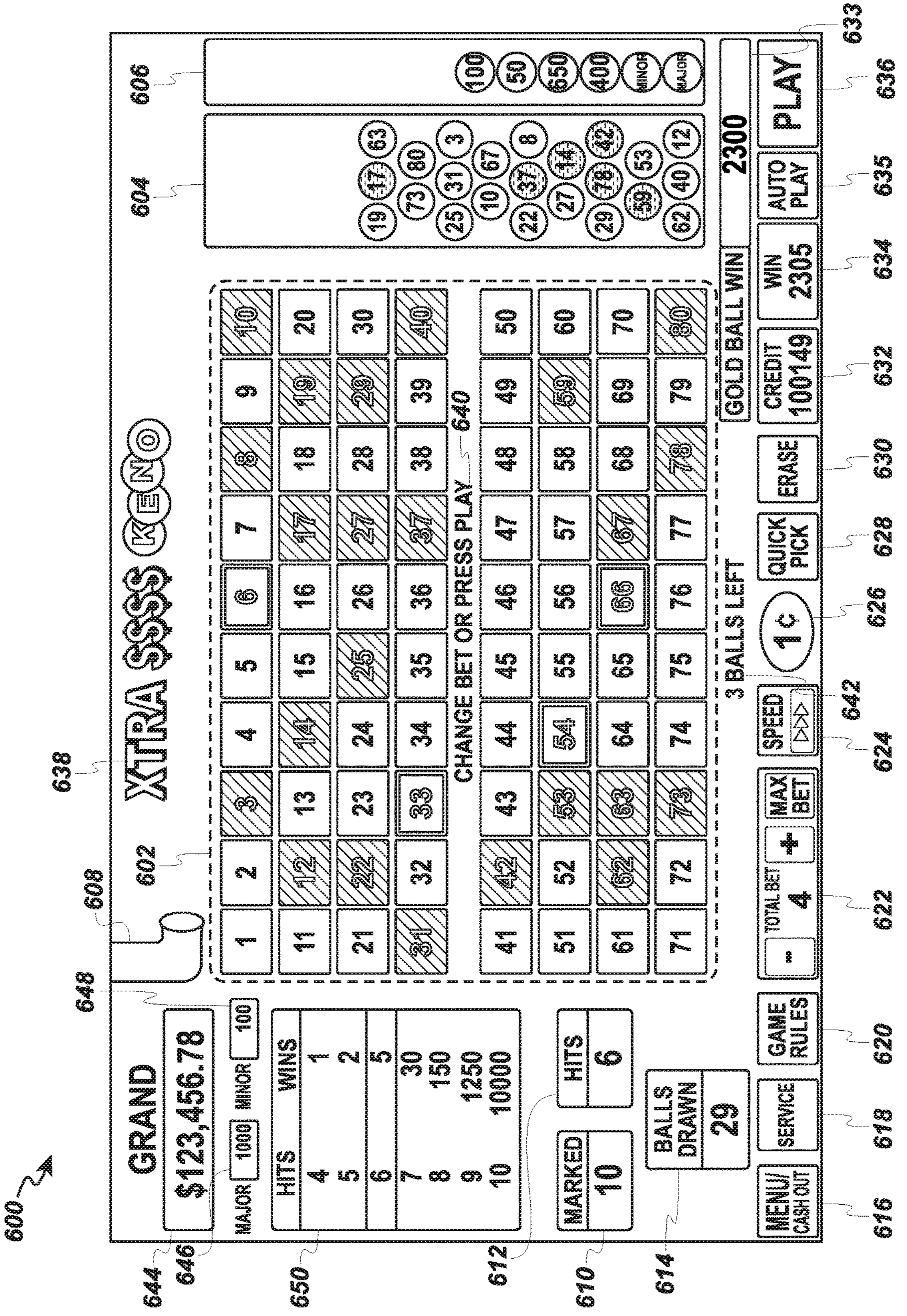
FIG. 10 depicts an example graphical user interface (GUI) of an example keno game as provided on a display of, for example, an EGM and as controlled by a game controller.

FIG. 10 depicts an example keno GUI 600. The example keno GUI 600 may be equivalent to the example keno GUI 600 depicted in FIG. 6 and duplicative description may be omitted. However, whereas FIG. 6 depicts the example keno GUI 600 before a bonus draw phase, or during a scenario where no bonus draw phase is activated, FIG. 10 may depict the example keno GUI 600 after a bonus draw phase has concluded.

In an example, a number of markers may be selected including three additional markers selected during the bonus draw phase (e.g., markers '19,' '17,' and '63'). This may increase the number of standard markers to '23,' which may be indicated, along with the six bonus markers, on the balls drawn indicator 614. Continuing the above example, one additional hit may occur due to the standard marker '17' selected during the bonus draw phase and the hit indicator 612 may be incremented in accordance with the additional selection.

After the conclusion of the game, the bonus marker win indicator 633 may be updated with the sum of all of the values indicated on the bonus markers present in the bonus marker area 606. As described herein, the "MINOR" and "MAJOR" indicators may reference the minor jackpot award 648 and the major jackpot award 646, and the indicated values may additionally be added in the bonus marker win indicator 633.

In addition, the win amount indicator 634 may display a sum of the value provided for in the bonus marker win indicator 633 and the value indicated by the pay table 650, corresponding to the amount of hits. The credit meter/indicator 632 may additionally be increased by the value indicated in the win amount indicator 634, thus concluding the round. In some cases, a game controller may then restart the game to begin an additional keno round.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims. As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not indicate that the described example is preferred or better than other examples.

What is claimed is:

1. A system comprising:

a display device configured to graphically render, in a graphical user interface, a keno game including a number of symbols; and a game controller configured to:

retrieve standard markers from at least one non-transitory machine readable medium using a random number generator and at least one lookup table to achieve a given level of volatility while maintaining a target return to player;

retrieve bonus markers from the at least one non-transitory machine readable medium using the random number generator and the at least one lookup table to achieve the given level of volatility while maintaining the target return to player;

when an amount of the bonus markers at least equals at least a threshold number:

graphically render a start of a bonus draw phase in the graphical user interface; and retrieve additional markers from the at least one non-transitory machine readable medium using the random number generator and the at least one lookup table to achieve the given level of volatility while maintaining the target return to player, the additional markers being additional ones of either the standard markers or the bonus markers; and query a paytable, stored in the at least one non-transitory machine readable medium, to determine a winning condition according to a number of matches between at least one of the standard markers, the bonus markers, and the additional markers and at least one user selection.

2. The system of claim 1, wherein the display device and the game controller are components of different devices.

3. The system of claim 2, wherein the game controller is a component of a server.

4. The system of claim 3, wherein the display device is a component of a gaming device.

5. The system of claim 4, wherein the gaming device is operable to receive an indication associated with the winning condition from the server.

6. The system of claim 4, wherein the gaming device includes a user interface configured to receive input.

7. The system of claim 6, wherein the gaming device communicates the input to the server.

8. The system of claim 6, wherein the input specifies a subset of the number of symbols.

9. A method comprising:

retrieving a first number of standard markers stored in at least one non-transitory machine readable medium using a random number generator and at least one lookup table to achieve a given level of volatility while maintaining a target return to player;

retrieving a second number of bonus markers stored in the at least one non-transitory machine readable medium using the random number generator and the at least one lookup table to achieve the given level of volatility while maintaining the target return to player;

when an amount of the second number of bonus markers is at least a threshold number of bonus markers:

graphically rendering a start of a bonus phase in a graphical user interface on a display device;

retrieving additional markers stored in the at least one non-transitory machine readable medium using the random number generator and the at least one lookup table to achieve the given level of volatility while maintaining the target return to player, the additional markers being additional ones of either the standard markers or the bonus markers; and querying a paytable, stored in the at least one non-transitory machine readable medium, to determine a winning condition according to a number of matches between at least one of the standard markers, the bonus markers, and the additional markers and at least one user selection.

10. The method of claim 9, further comprising graphically rendering in the graphical user interface a counter indicating markers to be selected.

11. The method of claim 10, further comprising resetting the counter in response to occurrence of a condition.

12. The method of claim 9, further comprising omitting initiating the bonus phase in response to occurrence of a condition.

13. The method of claim 9, further comprising communicating with a server to retrieve the first number of standard markers.

14. The method of claim 9, further comprising communicating with a remote device to graphically render the start of the bonus phase in the graphical user interface on the display device.

15. The method of claim 9, further comprising crediting a balance with a bonus sum upon determining that the number of matches results in a winning condition.

16. A method comprising:

retrieving a first number of bonus markers stored in at least one non-transitory machine readable medium using a random number generator and at least one lookup table to achieve a given level of volatility while maintaining a target return to player;

retrieving a second number of standard markers stored in the at least one non-transitory machine readable medium using the random number generator and the at least one lookup table to achieve the given level of volatility while maintaining the target return to player;

triggering an activation of a first bonus selection when an amount of the first number of bonus markers is at least a threshold number;

during the first bonus selection, retrieving a third number of markers stored in the at least one non-transitory machine readable medium using the random number generator and the at least one lookup table to achieve the given level of volatility while maintaining the target return to player, the third number of markers being additional ones of either the standard markers or the bonus markers;

when the third number of markers includes at least one additional bonus marker, graphically rendering a start of a second bonus selection in a graphical user interface on a display device;

during the second bonus selection, retrieving a fourth number of markers stored in the at least one non-transitory machine readable medium using the random number generator and the at least one lookup table to achieve the given level of volatility while maintaining the target return to player, the fourth number of markers being further additional ones of either the standard markers or the bonus markers; and querying a paytable, stored in the at least one non-transitory machine readable medium, to determine a sum of values associated with at least one of the first number of bonus markers and the at least one additional bonus marker.

17. The method of claim 16, further comprising combining a collection of bonus markers and a collection of standard markers into a common collection of markers during the first bonus selection.

18. The method of claim 16, wherein the third number of markers and the fourth number of markers are different.

19. The method of claim 16, further comprising initiating a third bonus selection when the fourth number of markers includes an additional bonus marker.

20. The method of claim 16, further comprising ending the first bonus selection or the second bonus selection when an upper limit is reached.

* * * * *